US006995101B2

(12) United States Patent
Zou et al.

(10) Patent No.: US 6,995,101 B2
(45) Date of Patent: Feb. 7, 2006

(54) OPTICAL GLASS AND OPTICAL PRODUCT USING THE SAME

(75) Inventors: Xuelu Zou, Akishima (JP); Hiromasa Tawarayama, Fussa (JP); Kazutaka Hayashi, Akishima (JP); Hiroshi Kawazoe, Yokohama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/893,958

(22) Filed: Jun. 29, 2001

(65) Prior Publication Data

US 2002/0042337 A1 Apr. 11, 2002

(30) Foreign Application Priority Data

Jun. 30, 2000 (JP) ............................ 2000-198035
Aug. 4, 2000 (JP) ............................ 2000-237358
Sep. 26, 2000 (JP) ............................ 2000-291539

(51) Int. Cl.
*C03C 3/21* (2006.01)
*C03C 3/19* (2006.01)
*C03C 13/02* (2006.01)

(52) U.S. Cl. ............................ 501/46; 501/45; 501/47; 501/48; 501/37; 501/38

(58) Field of Classification Search ............ 501/45–48, 501/37, 38
See application file for complete search history.

(56) References Cited

U.S. PATENT DOCUMENTS 4,115,131 A * 9/1978 Ishibashi et al. .............. 501/42
4,439,530 A 3/1984 Tajima
6,333,282 B1 * 12/2001 Nakahata et al. ............. 501/45

FOREIGN PATENT DOCUMENTS

DE 32 45 615 A1 8/1983
EP 1 078 894 A2 2/2001
EP 1 078 894 A3 2/2001
JP 07-097234 A 4/1995
JP 7-247135 A 9/1995
JP 7-247136 A 9/1995

OTHER PUBLICATIONS

Database WPI, Derwent Publications Ltd., AN 1999-076322, XP002271306, JP 10 316448 A (Sumita Kogaku Glass KK), Dec. 2, 1998.
Supplementary European Search Report issued in Application No. EP 01 94 3871, mailed Mar. 8, 2004.

* cited by examiner

*Primary Examiner*—Karl Group
*Assistant Examiner*—Elizabeth A. Bolden
(74) *Attorney, Agent, or Firm*—Buchanan Ingersoll PC

(57) ABSTRACT

An optical glass having a high refractive index and high dispersion characteristics suitable for application to precision press molding to precisely mold final products without requiring grinding or polishing. An optical glass can be prepared exhibiting a refractive index in the range of from 1.75 to 2.0, and an Abbé number in the range of from 20 to 28.5. Optical parts comprised of this glass; press-molding materials comprised of this glass; methods of manufacturing the same; and methods of manufacturing molded glass products employing these materials. A suitable optical glass is composed of the following in molar percent: 15–30% $P_2O_5$; 0.5–15% $B_2O_3$; 5–25% $Nb_2O_5$; 6–40% $WO_3$; 4–45% of at least one of $Li_2O$, $Na_2O$ or $K_2O$; 1–5% $K_2O$; 2–9% $TiO_2$; and 0–30% (excluding 30%) of at least one RO selected from among BaO, ZnO, and SrO; with the total content of the above-stated components being equal to or more than 95 percent.

107 Claims, 2 Drawing Sheets

OPTICAL GLASS AND OPTICAL PRODUCT USING THE SAME

FIELD OF THE INVENTION

The present invention relates to optical glass having a high refractive index and high dispersion characteristics that is suited to application to precision press molding to precisely mold the shape of final products for objectives not requiring grinding or polishing; optical parts comprised of this glass; press molding materials comprised of this glass; methods of manufacturing the same; and methods of manufacturing molded glass products employing these materials.

Specifically, the present invention relates to optical glass for precision press molding, glass preforms employing the same, and optical parts. More specifically, the present invention relates to optical glass for precision press molding in the manufacturing of ultraprecision aspherical lenses and the like that does not contain PbO, does not require grinding or polishing following precision press molding, permits precision press molding at low temperatures of 640° C. and below, and has a high refractive index, high dispersion, and a low glass transition temperature; as well as glass preforms and optical parts employing this optical glass.

RELATED ART

The technique of manufacturing optical parts such as aspherical lenses comprised of optical glass of high refractive index and high dispersion by precision press molding is an effective technique of manufacturing extremely important optical parts with good production properties. Thus, a number of patent applications have been filed and published relating to inventions in the field of optical glass that can be applied to this technique. However, the glass described in these patent unexamined publications involves low press temperatures to increase the service life of the mold used in precision press molding, and the incorporation of a large quantity of lead oxide in the optical glass composition.

For example, Japanese Patent Unexamined Publication No. Hei 1-308843 discloses optical glass for precision presses containing 30–58 weight percent of PbO and Japanese Patent Unexamined Publication No. Hei 7-247135 discloses low-melting-point optical glass comprising 25–54 weight percent of PbO.

Japanese Patent Unexamined Publication No. Hei 1-308843 discloses optical glass for precision presses comprised of, by weight, 15–50 percent of $SiO_2$; 30–58 percent of PbO; 0.1–7 percent of $Li_2O$, 0–15 percent of $Na_2O$, 0–15 percent of $K_2O$, where $Li_2O$+$Na_2O$+$K_2O$ comprise 3–25 percent; 0–15 percent of $La_2O_3$, 0–10 percent of MgO, 0–10 percent of $TiO_2$, where $La_2O_3$+MgO+$TiO_2$ comprise 0.1–20 percent; 0–5 percent of $ZrO_2$, 0–10 percent of $Al_2O_3$, where $ZrO_2$+$Al_2O_3$ comprise 0.1–10 percent; 0–20 percent of ZnO; 0–15 percent of $B_2O_3$, 0–5 percent of $Y_2O_3$, 0–5 percent of $Gd_2O_3$, 0–10 percent of CaO, 0–10 percent of SrO, 0–9 percent of BaO, 0–15 percent of $Nb_2O_5$, 0–5 percent of $Ta_2O_5$, 0–5 percent of $WO_3$, 0–5 percent of $P_2O_5$, 0–1 percent of $As_2O_3$, and 0–5 percent of $Sb_2O_3$. Further, Japanese Patent Unexamined Publication No. Hei 7-247135 discloses low-melting-point optical glass comprising, by weight, 10–35 percent of $P_2O_5$, 25–54 percent of PbO, 0–5 percent of $Li_2O$, 0–18 percent of $Na_2O$, 0–14 percent of $K_2O$, where $Li_2O$+$Na_2O$+$K_2O$ comprise 1–20 percent, 0–22 percent of $Nb_2O_5$, and 0–28 percent of $WO_3$, where $Nb_2O_5$+$WO_3$ comprise 5–35 percent.

However, precision press molding is ordinarily conducted in a nonreactive atmosphere or a weakly reducing atmosphere to prevent mold oxidation. When the glasses of the above-described compositions containing large amounts of lead oxide are precision pressed, lead oxide is reduced on the glass surface and precipitates onto the glass surface as metallic lead. Further, with repeated press molding, the precipitating metallic lead adheres to the molding surface of the mold, decreasing the precision of the molding surface and eventually causing loss of the surface precision of the transfer surface of the molded product. Thus, maintenance is required to remove the metallic lead adhering to the mold, compromising mass production. Further, metallic lead precipitates onto the surface of the molded optical product causing clouding, thus causing molded products to be rejected as defective. Further, the environmental pollution caused by melting of the above-described optical glass containing large amounts of lead oxide is also highly problematic. Accordingly, the glasses disclosed in Japanese Patent Unexamined Publication Nos. Hei 1-308843 and Hei 7-274135 are not suitable for use as precision press glass.

Among the optical glasses currently available on the market, there are lightened high refractive index high dispersion glasses that do not contain lead oxide (Japanese Patent Unexamined Publication No. Sho 62-3103). However, since these glasses have relatively high precision press forming temperatures of about 650° C. or more, they lead to marked deterioration of the mold materials employed in precision press molding when used in precision press molding, making mass production extremely difficult. Further, since the glasses themselves are unstable, there is a problem in that crystals in the glass that is pressed during precision pressing tends to precipitate so that even when a mold material capable of withstanding high temperatures is employed, extremely low yields are obtained in precision press molding. In this manner, the higher the temperature employed in precision press molding, the greater the problems in the form of oxidation and deterioration of the mold material, the more difficult it is to maintain surface precision, and the more difficult the mass production of optical parts becomes by precision press molding. Accordingly, there is a need to reduce to the extent possible the transition temperature and yield point temperature of the high refractive index, high dispersion optical glass employed in precision press molding.

Such a glass is described in Japanese Patent Unexamined Publication No. Hei 5-51233 to achieve reduction in press molding temperatures. This glass is comprised of, by weight, $SiO_2$: 10–20 percent, $GeO_2$: 3–15 percent, and $B_2O_3$: 0–7 percent, with the total quantity of $SiO_2$, $GeO_2$, and $B_2O_3$ being 20–27 percent; $TiO_2$: 19–29 percent, $Nb_2O_5$: 17–29 percent, and BaO: 0–7 percent, with the total quantity of $Nb_2O_5$, $TiO_2$, and BaO being 44–54 percent; $Li_2O$: 0–3 percent, $Na_2O$: 7–18 percent, $K_2O$: 0–22 percent, and $Cs_2O$: 0–20 percent, with the total quantity of $Li_2O$, $Na_2O$, $K_2O$, and $Cs_2O$ being 24–33 percent. The yield point temperature of this glass is not more than 550° C., its refractive index not less than 1.76, and its Abbé number is not more than 26.5, making it a highly refractive index, high dispersion optical glass. However, although this glass achieves the objective of temperature reduction, there is a problem in the form of coloration of the glass due to its high $TiO_2$ content, and there are also problems with the melting properties and stability of the glass during mass production. Since $GeO_2$, an essential component, is very expensive, this glass does not afford cost reduction in the production of optical parts. The glass described in Japanese Patent Unexamined Publication No.

Hei 5-51233 has a high liquid phase temperature and a strong tendency to lose transparency near its melting point, thus making it difficult to manufacture glass preforms for precision pressing and rendering this glass unsuitable for precision pressing.

Japanese Patent Unexamined Publication No. Hei 7-97234 discloses an invention having for its object to provide an optical glass having both a high refractive index and high dispersion characteristics, softening at low temperatures without losing transparency and thus suited to press molding, and having a low liquid phase temperature and good stability. The glasses described in the above-cited publication comprise a low-melting-point optical glass characterized by comprising by weight 2–29 percent of $P_2O_5$, 2–25 percent of $Na_2O$, not less than 4 and less than 22 percent of $Nb_2O_5$, and 20–52 percent $WO_3$, and a low-melting-point optical glass characterized by comprising by weight 12–32 percent of $P_2O_5$, 0.5–16 percent of $B_2O_3$, 0.3–6 percent of $Li_2O$, 2–22 percent of $Na_2O$, and 8–52 percent of $Nb_2O_5$.

These optical glasses do have both high refractive indexes and high dispersion characteristics, do soften at low temperatures without losing transparency and are thus suited to press molding, and do have low liquid phase temperatures and good stability. However, these glass have problems in that they contain large quantities of $Nb_2O_5$ and $WO_3$, causing coloration of the glass. Further, digital cameras, videos, and the like have grown smaller in recent years, and there is a strong demand to further simplify optical systems. In response, there is a strong need to mass produce optical glass having even higher refractive indexes and high dispersion characteristics than in the past; the above-described optical glasses have refractive indexes and dispersion characteristics that are still inadequate.

Ordinary press molding is conducted at a high temperature range of about 20–60° C. above the yield point temperature of the glass. When the yield point temperature of the glass exceeds 600° C., the press temperature becomes 620° C. or greater. Thus, OH adhering to the surface of the glass reacts with the mold material and ends up decomposing. This decomposition reaction leaves numerous bubbles on the surface of glass lenses that are formed by press molding. Thus, not only does it become difficult to maintain the degree of precision of the transfer surface of the optical part being precision molded, damage is done to the surface of the mold material, compromising mass production.

On the basis of such problems, the present invention has for its object to provide: an optical glass for precision press molding that does not contain PbO, that has a high refractive index, high dispersion characteristics, and a low glass transition temperature, and that permits precision press molding at low temperatures of 640° C. and below for the manufacturing of ultraprecise aspherical lenses that do not require grinding or polishing after precision press molding; and glass preforms and optical parts employing this optical glass.

A further object of the present invention is to provide optical glass having a high refractive index and high dispersion characteristics permitting application to the mass production of precision press molded products, optical constants principally in the form of a refractive index nd of 1.7–2.0 and an Abbé number νdof 20–32; and optical products and precision press molded materials comprised of this optical glass. A still further object of the present invention is to provide a method of manufacturing precision press molded materials comprised of the above-described optical glass and a method of manufacturing precision press molded products.

The present inventors conducted extensive research into achieving the above-stated objects, resulting in the discovery that these objects can be achieved by means of optical glass having a prescribed refractive index [nd], Abbé number [νd], and viscosity at the liquid phase temperature; optical glass having a prescribed refractive index [nd], Abbé number [νd], and glass transition temperature [Tg]; and optical glass having a prescribed composition. The present invention was devised on that basis.

SUMMARY OF THE INVENTION

That is, the present invention provides:

1. An optical glass (referred to hereinafter as optical glass (1)) exhibiting a refractive index in the range of from 1.75 to 2.0, an Abbé number in the range of from 20 to 28.5, and a viscosity at the liquid phase temperature equal to or higher than 0.4 Pa·s.
2. An optical glass (referred to hereinafter as optical glass (2)) exhibiting a refractive index in the range of from 1.75 to 2.0, an Abbé number in the range of from 20 to 28.5, and a glass transition temperature equal to or less than 540° C.
3. An optical glass (referred to hereinafter as optical glass (3)) exhibiting a refractive index in the range of from 1.75 to 2.0, an Abbé number in the range of from 20 to 28.5, and a transmittance λ80 is equal to or less than 500 nm and a transmittance λ5 is equal to or less than 385 nm.
4. The optical glass of any of 1–3 wherein said optical glass comprising, as molar percentages, 12–34 percent of $P_2O_5$; 0.2–15 percent of $B_2O_3$; 0–25 percent of $Nb_2O_5$; 0–40 percent of $WO_3$; 4–45 percent of at least one $R'_2O$ selected from among $Li_2O$, $Na_2O$, and $K_2O$; and 0–30 percent (excluding 30 percent) of at least one RO selected from among BaO, ZnO, and SrO; with the total content of the above-stated components being equal to or more than 94 percent.
5. The optical glass of any of 1–3 wherein said optical glass comprising, as molar percentages, 12–34 percent of $P_2O_5$; 0.2–15 percent of $B_2O_3$ (where the total quantity of $P_2O_5$ and $B_2O_3$ is 15–35 percent); 0–45 percent of $WO_3$; 0–25 percent of $Nb_2O_5$; 0 to 10 percent of $TiO_2$ (where the total quantity of $WO_3$, $Nb_2O_5$, and $TiO_2$ is 20–45 percent); 0–25 percent of BaO; 0–20 percent of ZnO (where the total quantity of BaO and ZnO is less than 30 percent); 2–30 percent of $Li_2O$; 2–30 percent of $Na_2O$; 0–15 percent of $K_2O$ (where the total quantity of $Li_2O$, $Na_2O$, and $K_2O$ is 10–45 percent); 0–10 percent of CaO; 0–10 percent of SrO; 0–5 percent of $Al_2O_3$; 0–5 percent of $Y_2O_3$; 0–1 percent of $Sb_2O_3$; and 0–1 percent of $As_2O_3$; where the total quantity of all of the above-listed components is equal to or more than 94 percent.
6. An optical glass comprising, as molar percentages, 15–30 mol percent of $P_2O_5$; 0.5–15 mol percent of $B_2O_3$; 5–25 mol percent of $Nb_2O_5$; 6–40 mol percent of $WO_3$; 4–45 mol percent of at least one $R'_2O$ selected from among $Li_2O$, $Na_2O$, and $K_2O$; and 0–30 percent (excluding 30 percent) of at least one RO selected from among BaO, ZnO, and SrO; with the total content of the above-stated components being equal to or more than 95 percent.
7. An optical glass (referred to hereinafter as optical glass (4)) comprising 15–30 percent of $P_2O_5$; 0.5–15 percent of $B_2O_3$; 5–25 percent of $Nb_2O_5$; 6–40 percent of $WO_3$;

4–45 percent of at least one $R'_2O$ selected from among $Li_2O$, $Na_2O$, and $K_2O$; and 0–30 percent (excluding 30 percent) of at least one RO selected from among BaO, ZnO, and SrO; with the total content of the above-stated components being equal to or more than 95 percent.

8. The optical glass of 7 avobe wherein said optical glass comprising 0–25 molar percent (excluding 0 molar percent) of BaO.

9. An optical glass (referred to hereinafter as optical glass (5)) comprising 15–30 percent of $P_2O_5$; 0.5–15 percent of $B_2O_3$; 5–25 percent of $Nb_2O_5$; 6–40 percent of $WO_3$; not more than 10 percent of $TiO_2$; 4–45 percent of at least one $R'_2O$ selected from among $Li_2O$, $Na_2O$, and $K_2O$; and 0–30 percent (excluding 30 percent) of at least one RO selected from among BaO, ZnO, and SrO.

10. An optical glass (referred to hereinafter as optical glass (6)) comprising, as molar percentages, 12–34 percent of $P_2O_5$; 0.2–15 percent of $B_2O_3$ (where the total quantity of $P_2O_5$ and $B_2O_3$ is 15–35 percent); 0–45 percent of $WO_3$; 0–25 percent of $Nb_2O_5$; 0 to 10 percent of $TiO_2$ (where the total quantity of $WO_3$, Nb2$O_5$, and $TiO_2$ is 20–45 percent); 0–25 percent of BaO; 0–20 percent of ZnO (where the total quantity of BaO and ZnO is less than 30 percent); 2–30 percent of $Li_2O$; 2–30 percent of $Na_2O$; 0–15 percent of $K_2O$ (where the total quantity of $Li_2O$, $Na_2O$, and $K_2O$ is 10–45 percent); 0–10 percent of CaO; 0–10 percent of SrO; 0–5 percent of $Al_2O_3$; 0–5 percent of $Y_2O_3$; 0–1 percent of $Sb_2O_3$; and 0–1 percent of $As_2O_3$; where the total quantity of all of the above-listed components is equal to or more than 94 percent; a density of oxygen atoms contained is in the range of from $4.2\times10^{22}$ to $5.2\times10^{22}/cm^3$.

11. An optical glass (referred to hereinafter as optical glass (7)) comprising, as molar percentages, 12–34 percent of $P_2O_5$; 0.2–15 percent of $B_2O_3$ (where the total quantity of $P_2O_5$ and $B_2O_3$ is 15–35 percent); 2–45 percent of $WO_3$; 0–25 percent of $Nb_2O_5$; 0 to 10 percent of $TiO_2$ (where the total quantity of $WO_3$, $Nb_2O_5$, and $TiO_2$ is 20–45 percent); 0–25 percent of BaO; 0–20 percent of ZnO (where the total quantity of BaO and ZnO is less than 30 percent); 2–30 percent of $Li_2O$; 2–30 percent of $Na_2O$; 0–15 percent of $K_2O$ (where the total quantity of $Li_2O$, $Na_2O$, and $K_2O$ is 29–45 percent); 0–10 percent of CaO; 0–10 percent of SrO; 0–5 percent of $Al_2O_3$; 0–5 percent of $Y_2O_3$; 0–1 percent of $Sb_2O_3$; and 0–1 percent of $As_2O_3$; where the total quantity of all of the above-listed components is equal to or more than 94 percent.

12. An optical glass (referred to hereinafter as optical glass (8)) comprising, as molar percentages, 12–34 percent of $P_2O_5$; 0.2–15 percent of $B_2O_3$ (where the total quantity of $P_2O_5$ and $B_2O_3$ is 15–35 percent); 2–45 percent of $WO_3$; 0–25 percent of $Nb_2O_5$; 0 to 10 percent of $TiO_2$ (where the total quantity of $WO_3$, $Nb_2O_5$, and $TiO_2$ is 20–45 percent); 0–11 percent of BaO; 0–20 percent of ZnO (where the total quantity of BaO and ZnO is less than 30 percent); 2–30 percent of $Li_2O$; 2–30 percent of $Na_2O$; 0–15 percent of $K_2O$ (where the total quantity of $Li_2O$, $Na_2O$, and $K_2O$ is 10–45 percent); 0–10 percent of CaO; 0–10 percent of SrO; 0–5 percent of $Al_2O_3$; 0–5 percent of $Y_2O_3$; 0–1 percent of $Sb_2O_3$; and 0–1 percent of $As_2O_3$; where the total quantity of all of the above-listed components is equal to or more than 94 percent.

13. The optical glass of any of 10–12 above wherein said optical glass has the composition comprising, as essential components, $P_2O_5$, $B_2O_3$, $WO_3$, $Nb_2O_5$, $TiO_2$, BaO, ZnO, $Li_2O$, $Na_2O$ and $K_2O$ or the composition comprising the above essential components and $Sb_2O_3$.

14. The optical glass of 10 or 11 avobe wherein said optical glass comprises 0–11 percent of BaO.

15. The optical glass of 10 or 12 above wherein said total quantity of $Li_2O$, $Na_2O$, and $K_2O$ is equal to or more than 29 percent.

16. The optical glass of any of 10 to 12 above wherein said optical glass has a density of oxygen atoms contained in the range of from $4.2\times10^{22}$ to $5.2\times10^{22}/cm^3$.

17. An optical glass (referred to hereinafter as optical glass (9)) comprising $P_2O_5$, $B_2O_3$, $WO_3$ and an alkali metal oxide, wherein the total quantity of $P_2O_5$ and $B_2O_3$ is 15–35 molar percent and a content of $WO_3$ is 2–45 molar percent and a density of oxygen atoms contained ranges from $4.2\times10^{22}$ to $5.2\times10^{22}$/cm.

18. The optical glass of 17 above wherein said optical glass comprises 2–30 molar percent of $Li_2O$.

19. The optical glass of any of 10–18 above wherein said optical glass does not comprise substantial amount of $GeO_2$.

20. The optical glass of any of 10–19 above wherein said optical glass exhibits a glass transition temperature equal to and/or less than 530° C. and a yield point temperature equal to or less than 580° C.

21. The optical glass of any of 10–20 above wherein said optical glass exhibits a refractive index in the range of from 1.7 to 2.0, an Abbé number in the range of from 20 to 32.

22. The optical glass of any of 10–20 above wherein said optical glass exhibits a liquid phase temperature equal to or less than 970° C.

23. An optical part being composed of the optical glass of any of 1–22 above.

24. A glass preform being composed of the optical glass of any of 1–22 above.

25. A method of manufacturing glass preforms wherein a prescribed amount of a piece of molten glass flowing out of a flowout pipe is received in a receiving mold to prepare a glass preform made of the optical glass of any of 1–22 above.

26. A method of manufacturing glass preforms made of the optical glass of any of 1–22 above, comprising the steps of:

a molten glass glob is made to fall by causing molten glass flowing out of a flowout pipe to drip naturally or by cutting with a cutting blade;

the molten glass glob is received in a depression in a forming mold, and in the process, air, a nonreactive gas or some other gas is blown out through minute holes in the depressions; and, a layer of air is generated between the molten glass glob and the inner surface of depression in the forming mold and the molten glass glob is maintained and cooled within the depression in a state of essential non–contact with the inner surface of the depression until at least a portion of the outer surface of the molten glass glob reaches a temperature not greater than the melting temperature.

27. A method of manufacturing glass products comprising the steps of:

heating the glass preform of 24 above or the glass preform prepared by the method of 25; above and precisely press molding the heated glass preform to obtain a glass product.

BEST MODES FOR CARRYING OUT THE PRESENT INVENTION

Figure 1:
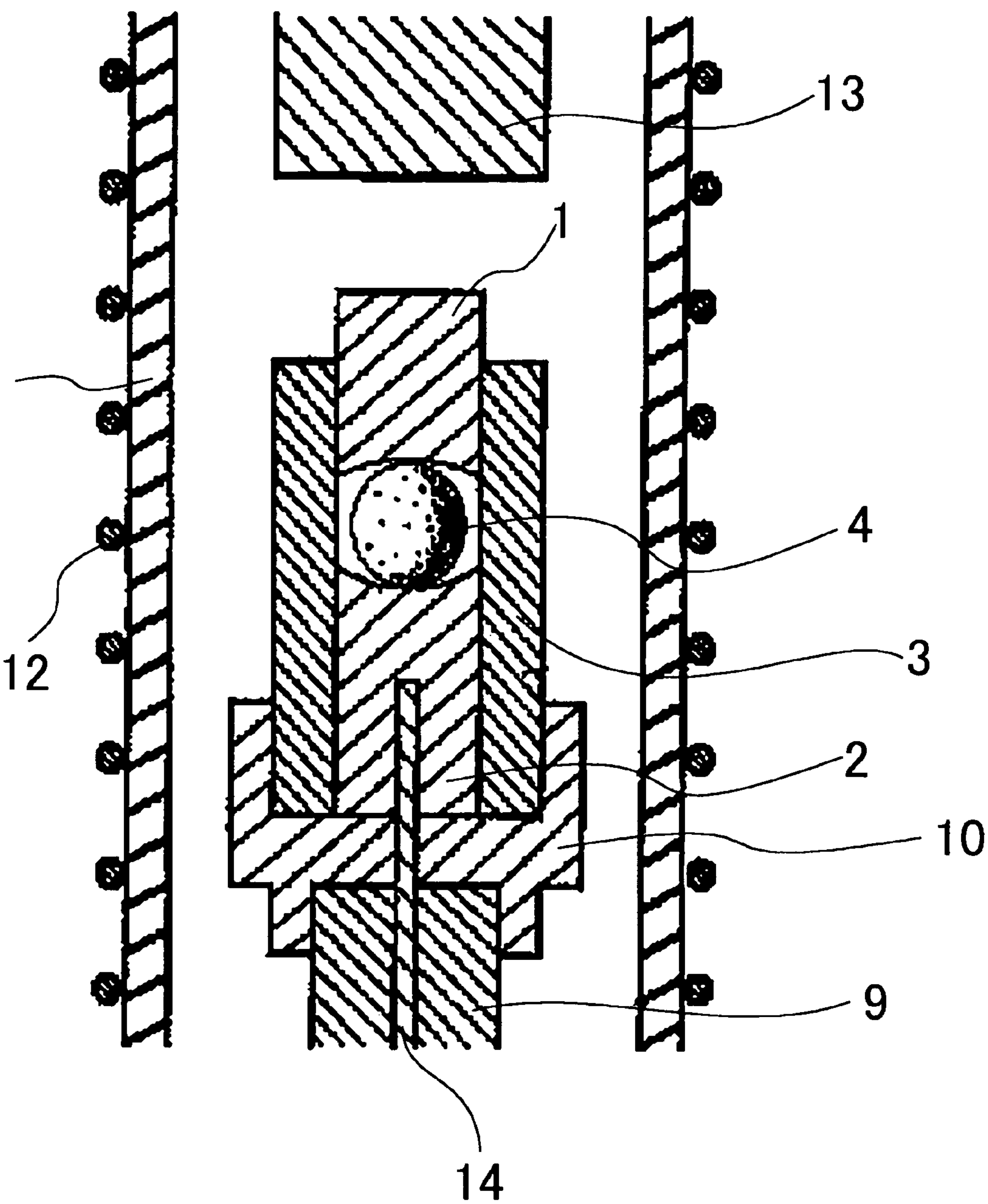
FIG. 1 is a schematic drawing of the press device for precision press molding of precision press molded materials comprised of the optical glass of the present invention.

The optical glass of the present invention comprises the nine forms of optical glasses (1)–(9); each of these optical glasses will be described.

Optical glass (1) has a refractive index [nd] of 1.75–2.0, an Abbé number [νd] of 20–28.5, and a viscosity at the liquid phase temperature of not less than 0.4 Pa·s. In optical glass (1), the glass transition temperature [Tg] is normally not greater than 540° C., but can also be made 520° C. or less, 510° C. or less, or 490° C. or less. Further, the yield point temperature [Ts] of the glass is normally not greater than 580° C., but can also be made 570° C. or less, 560° C. or less, or 550° C. or less.

Optical glass (2) has a refractive index [nd] of 1.75–2.0, an Abbé number [νd] of 20–28.5, and a glass transition temperature [Tg] of not more than 540° C. In optical glass (2), the glass transition temperature [Tg] is not greater than 540° C., but can be made 520° C. or less, 510° C. or less, or 490° C. or less. The glass yield point temperature [Ts] is normally not greater than 580° C., but can be made 570° C. or less, 560° C. or less, or 550° C. or less. The viscosity at the liquid phase temperature is normally not less than 0.4 Pa·s.

Optical glass (3) has a refractive index [nd] of 1.75–2.0, an Abbé number [νd] of 20–28.5, and a transmittance λ80 is equal to or less than 500 nm and a transmittance λ5 is equal to or less than 385 nm. In optical glass (3), the glass transition temperature [Tg] is not greater than 540° C., but can be made 520° C. or less, 510° C. or less, or 490° C. or less. The glass yield point temperature [Ts] is normally not greater than 580° C., but can be made 570° C. or less, 560° C. or less, or 550° C. or less. The viscosity at the liquid phase temperature is normally not less than 0.4 Pa·s.

Optical glasses (1)–(3) have optical constants in the form of a refractive index [nd] of 1.75–2.0 and an Abbé number [νd] of 20–28.5. However, refractive index [nd] can be further restricted to 1.80–2.0, 1.83–2.0, and 1.83–1.9. The Abbé number [νd] is kept within 23–28.

Optical glasses (1)–(3) may be an optical glass comprising, as molar percentages, 12–34 percent of $P_2O_5$; 0.2–15 percent of $B_2O_3$; 0–25 percent of $Nb_2O_5$; 0–40 percent of $WO_3$; 4–45 percent of at least one $R'_2O$ selected from among $Li_2O$, $Na_2O$, and $K_2O$; and 0–30 percent (excluding 30 percent) of at least one RO selected from among BaO, ZnO, and SrO; with the total content of the above-stated components being equal to or more than 94 percent.

Optical glasses (1)–(3) may also be an optical glass comprising, as molar percentages, 12–34 percent of $P_2O_5$; 0.2–15 percent of $B_2O_3$ (where the total quantity of $P_2O_5$ and $B_2O_3$ is 15–35 percent); 0–45 percent of $WO_3$; 0–25 percent of $Nb_2O_5$; 0 to 10 percent of $TiO_2$ (where the total quantity of $WO_3$, $Nb_2O_5$, and $TiO_2$ is 20–45 percent); 0–25 percent of BaO; 0–20 percent of ZnO (where the total quantity of BaO and ZnO is less than 30 percent); 2–30 percent of $Li_2O$; 2–30 percent of $Na_2O$; 0–15 percent of $K_2O$ (where the total quantity of $Li_2O$, $Na_2O$, and $K_2O$ is 10–45 percent); 0–10 percent of CaO; 0–10 percent of SrO; 0–5 percent of $Al_2O_3$; 0–5 percent of $Y_2O_3$; 0–1 percent of $Sb_2O_3$; and 0–1 percent of $As_2O_3$; where the total quantity of all of the above-listed components is equal to or more than 94 percent.

Optical glasses (1)–(3) may also be an optical glass comprising as molar percentages 15–30 percent of $P_2O_5$; 0.5–15 percent of $B_2O_3$; 5–25 percent of $Nb_2O_5$; 6–40 percent of $WO_3$; 4–45 percent of at least one ($R'_2O$) selected from among $Li_2O$, $Na_2O$, and $K_2O$; and 0–30 molar percent (30 molar percent excluded) of at least one (RO) selected from among BaO, ZnO, and SrO; with the total content of the above-stated components comprising not less than 95 percent. This optical glass is the same glass composition as optical glasses (4).

Optical glass (5) of the present invention has the composition comprises 15–30 percent of $P_2O_5$; 0.5–15 percent of $B_2O_3$; 5–25 percent of $Nb_2O_5$; 6–40 percent of $WO_3$; not more than 10 percent of $TiO_2$; 4–45 percent of at least one $R'_2O$ selected from among $Li_2O$, $Na_2O$, and $K_2O$; and 0–30 molar percent (excluding 30 molar percent) of at least one RO selected from among BaO, ZnO, and SrO.

The preferred composition of optical glass (5) is 15–30 percent of $P_2O_5$; 0.5–15 percent of $B_2O_3$; 5–25 percent of $Nb_2O_5$; 6–40 percent of $WO_3$; 0–25 percent of BaO; 0–15 percent of ZnO, 0–10 percent of $TiO_2$ (excluding 0 percent), and 4–45 percent of at least one ($R'_2O$) selected from among $Li_2O$, $Na_2O$, and $K_2O$.

In optical glasses (4) and (5), $P_2O_5$ forms a meshlike structure in the glass and is an essential component for imparting stability to the glass to permit manufacturing. However, when the content of $P_2O_5$ exceeds 30 molar percent, the Tg temperature and yield point temperature of the glass increase, the refractive index decreases, and the Abbé number tends to rise. At less than 15 molar percent, the glass tends strongly to lose transparency and the glass becomes unstable. Thus, the $P_2O_3$ content is set within the range of 15–30 molar percent, preferably the range of 16–27 molar percent.

$B_2O_3$ is an essential component of the glass of the present invention. This component improves the melting properties of the glass and is extremely effective at homogenizing the glass. At the same time, the incorporation of a small quantity of $B_2O_3$ changes the binding properties of OH within the glass; this component is extremely effective at preventing the glass from bubbling during pressing. However, when more than 15 molar percent of $B_2O_3$ is incorporated, glass comprising a large quantity of $Nb_2O_5$ to maintain a high refractive index becomes extremely unstable. When less than 0.5 molar percent is introduced, the glass tends to bubble during precision press molding. Thus, the content is set to 0.5–15 molar percent, preferably 1–13 molar percent.

$Nb_2O_5$ is an essential component of the present invention. It is required to impart characteristics such as a high refractive index and high dispersion to the glass without using PbO, performing a highly important role in the present invention. However, when the content thereof exceeds 25 molar percent, the glass transition temperature and yield point temperature increase, stability deteriorates, high-temperature melting properties deteriorate, and bubbling and coloration tend to occur during precision pressing. By contrast, when the content is less than 5 molar percent, the glass refractive index and dispersion decrease. Thus, the content of $Nb_2O_5$ is set to 5–25 molar percent, preferably 10–25 molar percent, and more preferably 12–22 molar percent.

$WO_3$ is an essential component of the present invention imparting to the glass a high refractive index and high dispersion characteristics at low temperature without the use of PbO; it is the most effective component of the present invention. $WO_3$ performs the role of reducing the transition temperature and yield point temperature of the glass in the same manner as the addition of an alkali metal oxide, has the effect of raising the refractive index, and inhibits wetting between the glass and the mold material, thereby resulting in extremely good separation of the glass from the mold during precision press molding. It also has the effect of inhibiting increased wetting of the flowout pipe by molten glass. However, when the content of this component exceeds 40 molar percent, the glass tends to develop color and the high-temperature viscosity of the glass drops, making it difficult to manufacture glass preforms for precision pressing. At less than 6 molar percent, the glass transition temperature and yield point temperature rise and bubbles tend to form in the glass during precision pressing. Thus, the content is set at 6–40 molar percent, preferably 6–30 molar percent, more preferably 6–22 molar percent, and still more preferably 9–20 molar percent.

As an RO component, BaO increases the glass refractive index, improves resistance to loss of transparency, and lowers the liquid phase temperature. Since it also increases viscosity at the glass liquid phase temperature, the content thereof may be suitably selected. However, when the content of BaO exceeds 25 molar percent, not only does the glass become unstable, but the chemical resistance of the glass deteriorates. Thus, the BaO content is set to within the range of 0–25 molar percent. Further, when a lowering of the glass transition point is desired to decrease the pressing temperature, 0–22 molar percent is preferred, with 0–19 molar percent being even more preferred. However, since even small amounts of BaO have the effect of increasing resistance to loss of transparency, in consideration of the stability of the glass, 2–25 molar percent is preferred, 4–22 molar percent is more preferred, and 5–19 molar percent is even more preferred.

Further, from the perspective of resistance to loss of transparency, BaO can also be replaced with an $R'_2O$ ($Li_2O+Na_2O+K_2O$) component. In that case, the total of BaO and $R'_2O$ component is preferably 10–55 molar percent, more preferably 25–50 molar percent.

At least one from among $Li_2O$, $Na_2O$, and $K_2O$ is selected as $R'_2O$. Each of these components may be incorporated to improve the resistance of the glass to loss of transparency, decrease the yield point temperature and liquid phase temperature, and improve the high-temperature melting properties of the glass. Thus, not less than 2 molar percent each of $Li_2O$ and $Na_2O$ are thus desirably incorporated. However, when the quantity of either $Li_2O$ and $Na_2O$ that is incorporated exceeds 30 molar percent, not only does the stability of the glass deteriorate, but it becomes impossible to achieve the desired high refractive index and high dispersion characteristics. Accordingly, the content of each of $Li_2O$ and $Na_2O$ is 2–30 molar percent, the content of $Li_2O$ preferably being 5–25 molar percent, more preferably 5–20 molar percent. Since $Li_2O$ is particularly effective at raising the refractive index, it is employed to advantage in the glass of the present invention, preferably at a content of 8–20 molar percent, more preferably 10–20 molar percent. The content of $Na_2O$ is 3–25 molar percent, preferably 3–22 molar percent, more preferably 3–20 molar percent, and most preferably 5–13 molar percent. When a large quantity of alkali metal oxide is incorporated, not only does the stability of the glass deteriorate, but it becomes impossible to achieve the desired high refractive index and high dispersion characteristics. Accordingly, the content of $K_2O$ is preferably not more than 15 molar percent, more preferably 0–8 molar percent, and still more preferably 1–5 molar percent.

The content of $R'_2O$ is 4–45 molar percent, preferably 8–45 molar percent, more preferably 15–45 molar percent, still more preferably 18–43 molar percent, and even more preferably 19–40 molar percent.

In addition to the above-described essential components, the following, given as molar percentages, may also be added to optical glasses I, II, and III of the present invention: 0–10 percent of $TiO_2$, 0–12 percent of ZnO, 0–10 percent of SrO, 0–15 percent of $K_2O$, 0–5 percent of $Al_2O_3$, 0–1 percent of $Sb_2O_3$, and 0–1 percent of $As_2O_3$, where the total content of $Nb_2O_5$, $WO_3$, and $TiO_2$ is 25–45 percent; the total content of BaO, ZnO, and SrO is 5–25 percent; the total content of $Li_2O$, $Na_2$, and $K_2O$ is 4–35 percent; and the total content of $P_2O_5$, $B_2O_3$, $Nb_2O_5$, $WO_3$, BaO, $Li_2O$, $Na_2O$, $TiO_2$, ZnO, SrO, $K_2O$, $Al_2O_3$, $Sb_2O_3$, and $As_2O_3$ is 95 percent.

$TiO_2$ is an optional component having the effect of increasing the glass refractive index and improving resistance to loss of transparency. When the content thereof exceeds 10 molar percent, the resistance to loss of transparency of the glass deteriorates sharply, both the yield point temperature and liquid phase temperature rise abruptly, and the glass tends to develop color during precision pressing. Thus, the content of $TiO_2$ is preferably not more than 10 molar percent, more preferably not more than 9 molar percent, and still more preferably 2–9 molar percent. When the total content of $Nb_2O_5$, $WO_3$, and $TiO_2$ exceeds 45 molar percent, a high refractive index and high dispersion characteristics can be obtained, but the molten glass develops color and resistance to loss of transparency deteriorates; when the total content thereof is less than 25 molar percent, it becomes impossible to obtain desired optical characteristics such as [a high] refractive index and dispersion. Thus, the total content of $Nb_2O_5$, $WO_3$, and $TiO_2$ is preferably within the range of 25–45 molar percent, more preferably 27–42 molar percent, and still more preferably 30–40 molar percent. The content of $Nb_2O_5$ is preferably 10–29 molar percent, and that of $WO_3$ is preferably 3–30 molar percent.

ZnO, as an RO component, is an optional component incorporated to increase the glass refractive index and dispersion. The introduction of a small quantity of ZnO has the effect of reducing the glass transition temperature, yield point temperature, and liquid phase temperature. However, when a large quantity is introduced, the resistance of the glass to loss of transparency deteriorates sharply and the liquid phase temperature tends to rise. Thus, the content thereof is preferably not more than 15 molar percent, more preferably not more than 13 molar percent, and still more preferably 3–10 molar percent.

SrO, as an RO component, is an optional component of the present invention. The introduction of a small quantity of SrO into the glass has the effect of reducing the liquid phase temperature of the glass and increasing stability. However, when more than 10 molar percent is introduced, it becomes impossible to achieve the desired high refractive index and high dispersion characteristics and resistance to loss of transparency deteriorates. Thus, the content of SrO is preferably not more than 10 molar percent, more preferably 8 molar percent. However, when the combined content of BaO, ZnO, and SrO reaches or exceeds 30 molar percent, glass stability deteriorates and both the yield point temperature and liquid phase temperature rise, making it impossible to achieve the desired low yield point temperature and low liquid phase temperature. Accordingly, the total of those compounds is preferably 5–25 molar percent, more preferably 6–23 molar percent, and still more preferably 10–20 molar percent.

The addition of a suitable quantity of $Al_2O_3$, an optional component, has the effect of increasing the viscosity at the liquid phase temperature of the glass and improving the durability of the glass. However, when 5 molar percent is exceeded, the glass tends not to melt and the yield point temperature and liquid phase temperature both rise. Accordingly, the total content is preferably not more than 5 molar percent, more preferably not more than 4 molar percent.

$As_2O_3$ and $Sb_2O_3$ are effective as glass clarifying agents. However, when either is added in a quantity exceeding 1 molar percent, the glass tends to develop bubbles during precision pressing. Thus, a content not exceeding 1 molar percent is preferred. If bubbles can be dealt with by the melting technique during melting of the glass, the omission of these compounds is preferable.

In the optical glass (4) of the present invention, the total quantity of the above-described essential components and optional components is preferably not less than 95 molar percent. In addition, $SiO_2$, $La_2O_3$, $Y_2O_3$, $Gd_2O_3$, $ZrO_2$, $Ta_2O_5$, $Bi_2O_3$, $TeO_2$, CaO, MgO, $Cs_2$, and the like may be incorporated up to 5 molar percent so long as the object of the present invention is not lost.

Optical glass (5) of the present invention, in addition to the above-described essential components, further comprises not more than 12 percent of ZnO and not more than 10 percent of $TiO_2$ from among the above-described optional components. The total content of $Nb_2O_5$, $WO_3$, and $TiO_2$ is preferably 25–45 molar percent, more preferably 27–42 molar percent, and still more preferably, 30–40 molar percent. The total content of BaO and ZnO is preferably 5–25 molar percent, more preferably 6–23 molar percent, and still more preferably 10–20 molar percent.

Optical glass (5) of the present invention is preferably comprises 15–30 percent of $P_2O_5$; 0.5–15 percent of $B_2O_3$; 5–25 percent of $Nb_2O_5$; 6–40 percent of $WO_3$; 0–25 percent of BaO; 0–15 percent of ZnO; 0–10 percent (excluding 0 percent) of $TiO_2$; 4–45 percent of at least one $R'_2O$ selected from among $Li_2O$, $Na_2O$, and $K_2O$; and the content of BaO is preferably 5–25 percent.

In the optical glasses (1)–(5) of the present invention, the followings are preferred.

An optical glass in which a part of BaO was substituted by ZnO and/or SrO, and the content of ZnO ranges from 0 to 15 molar percent and the content of SrO ranges from 0 to 10 molar percent.

An optical glass in which a part of BaO was substituted by ZnO, and the content of ZnO ranges from 0 to 13 molar percent (excluding 0 percent).

An optical glass in which a part of BaO was substituted by ZnO, and the content of BaO ranges from 6 to 15 molar percent the content of ZnO ranges from 3 to 13 molar percent.

An optical glass in which the content of $R'_2O$ ranges from 15 to 45 molar percent.

An optical glass in which $R'_2O$ is $Li_2O$, $Na_2O$, and $K_2O$ and the contents of $Li_2O$, $Na_2O$, and $K_2O$ respectively ranges from 2 to 30 molar percent, 2 to 30 molar percent, ad equal to or less than 15 molar percent.

An optical glass in which $R'_2O$ is $Li_2O$, $Na_2O$, and $K_2O$ and the contents of $Li_2O$, $Na_2O$, and $K_2O$ respectively ranges from 5 to 25 molar percent, 5 to 25 molar percent, ad 0 to 8 molar percent.

An optical glass in which the content of $TiO_2$ is equal to or less than 10 molar percent.

An optical glass in which the content of $Nb_2O_5$ ranges from 10 to 25 molar percent, the content of $WO_3$ ranges from 6 to 30 molar percent and the content of $TiO_2$ ranges from 2 to 9 molar percent.

An optical glass in which the total content of $Nb_2O_5$, $WO_3$ and $TiO_2$ ranges from 30 to 40 molar percent.

An optical glass exhibiting a refractive index in the range of from 1.75 to 2.0, an Abbé number in the range of from 20 to 28.5.

An optical glass exhibiting a yield point temperature equal to or less than 580° C.

An optical glass exhibiting a glass transition temperature equal to or less than 540° C.

An optical glass exhibiting a viscosity at a liquid phase temperature equal to or more than 0.4 Pa·s.

By employing the above-stated glass compositions, it is possible to obtain optical glasses (4) and (5) of the present invention with refractive indexes [nd] of 1.75–2.0, even 1.80–2.0, 1.83–2.0, and 1.83–1.9. Further, an Abbé number [νd] of 20–28.5, even 23–28 can be obtained. A glass yield point temperature [Ts] of 580° C. or less, or even 570° C. or less, 560° C. or less, or 550° C. or less can be obtained. A glass transition temperature [Tg] of 540° C. or less, 520° C. or less, 510° C. or less, or even 490° C. or less can be obtained.

The viscosity at the liquid phase temperature of optical glasses (4) and (5) can be kept to 0.4 Pa·s or less.

Optical glasses (6)–(9) of the present invention have optical constants in the form of a refractive index nd of 1.7–2.0 and an Abbé number νd of 20–32. The optical glasses of modes I and II of the present invention both have a glass transition temperature Tg of not more than 530° C. and a yield point temperature Ts of not more than 580° C., and are suited to precision press molding.

Although the optical glasses (6)–(9) of the present invention have optical constants in the form of a refractive index nd of 1.7–2.0 and an Abbé number νd of 20–32, they preferably have a refractive index nd of 1.80–1.90 to obtain a more stable optical glass suited to precision press molding.

Further, the optical glasses (6)–(9) of the present invention preferably do not contain lead compounds such as PbO, and preferably do not contain $GeO_2$, in order to achieve the objects of the present invention.

The usual representative components of glass are glass formers in the form of $SiO_2$, $P_2O_5$, $B_2O_3$, and the like, and the usual glass modifiers are $Li_2O$, $Na_2O$, $K_2O$, BaO, ZnO, $Nb_2O_5$, $WO_3$, and the like. It is principally the electrons of oxygen ions that determine, based on whether the electrons of these oxygen ions are loosely or tightly bound, the absorption and dispersion of the glass constituted by these components. The absorption of oxygen in the glass includes crosslinked oxygen linking glass formants together and noncrosslinked oxygen that does not (oxygen bonded to modifier ions such as $Na^+$, $Ba^{2+}$, and $Y^{3+}$). Although absorption caused by the transfer of electrons of crosslinked oxygen in the ultraviolet range greatly affects the glass refractive index, it does not greatly affect dispersion. That is, the greater the absorption due to electron transfer in crosslinked oxygen, and the longer the wavelength of the peak absorption wavelength becomes, the greater the glass diffraction index becomes, but the Abbé number does not change that much. By contrast, absorption due to electron transfer in noncrosslinked oxygen in the ultraviolet range greatly affects both the glass refractive index and dispersion. The longer the peak wavelength in absorption due to electron transfer in noncrosslinked oxygen, and the more intense the oscillators become, the greater the refractive index and dispersion become. Accordingly, to generate glass with a high refractive index and high dispersion, the generation of numerous noncrosslinked oxygen atoms within the glass structure is thought to be extremely important.

That is, the present inventors think that to manufacture glass of high refractive index and high dispersion, it is extremely important to minimize the ratio of the number of former ions creating crosslinked oxygen ions to the total number of oxygen ions in the structural body per each unit volume of glass. Based on this idea, the present inventors developed the optical glasses of modes I and II.

That is, the present inventors discovered that in borophosphate glass, particularly in borophosphate glass comprising $P_2O_5$, $B_2O_3$, $WO_3$, and an alkali metal oxide compound, imparting an ion ratio of the number of oxygen ions per glass unit volume to the total quantity of phosphorus ions and boron ions in the former of the meshlike structure of the glass of at least 4.2 makes it possible to achieve a glass refractive index of at least 1.70 and an Abbé number of not greater than 32. That is, it was discovered that the refractive index and dispersion of the glass could be controlled in borophosphate glasses by controlling the density of oxygen atoms per glass unit volume and the total quantity of formers in the form of glass meshlike structure forming compounds.

Denoting the molar fraction of glass component Ci (hereinafter, i denotes a whole number characteristic of the glass component) as Xi, the density of the glass at room temperature as d (g/cm$^3$), the molecular weight of glass component Ci as Mi, the number of oxygen atoms contained in one molecule of glass component Ci as Oi, and the average molecular weight of the glass as M (where M=SMiXi, S being a symbol meaning summation of all the glass components), the oxygen atom density D (atoms/cm$^3$) per unit volume of glass can be calculated from the following equation:

$$D = 6.023\left(\frac{d}{M}\right)10^{23}\sum X_iO_i$$

For example, Oi is 5 atoms for $P_2O_5$, Oi is 3 atoms for $B_2O_3$, and Oi is three atoms for $WO_3$.

The higher the density of oxygen per unit of glass, or the lower the content of glass former, the higher the refractive index. However, it is necessary to keep the ion ratio of the number of oxygen atoms per unit volume of glass to the total of phosphorus ions and boron ions serving as the former of the glass meshlike structure greater than 4.2. Thus, in the optical glass of the present invention, the oxygen atom density in the composition range permitting vitrification is set from $4.2\times10^{22}$ to $5.2\times10^{22}$ atoms/cm$^3$. When the oxygen atom density is less than $4.2\times10^{22}$/cm$^3$, the refractive index drops below 1.7, and when it exceeds $5.2\times10^{22}$/cm$^3$, the content of alkali metal ions and alkaline earth metal ions in the components with low oxygen atom densities decreases. As a result, the glass may crystallize or develop color. Thus, the oxygen atom density per unit volume of glass is preferably from $4.5\times10^{22}$/cm$^3$ to $5.0\times10^{22}$/cm$^3$.

The role of each of the above-described glass components of the optical glasses (6) to (9) and the reasons for limiting their composition ranges will be described next.

$P_2O_5$ is a former of the glass meshlike structure and is an essential component for maintaining stability permitting the manufacture of glass. However, when the content of $P_2O_5$ exceeds 34 molar percent, the glass transition temperature Tg and the yield point temperature Ts tend to rise, the refractive index nd tends to drop, and the Abbé number νd tends to increase. When the $P_2O_5$ content is less than 12 molar percent, the tendency of the glass to lose transparency increases and the glass becomes unstable. Thus, the quantity of $P_2O_5$ is set to a range of 12–34 molar percent. The $P_2O_5$ content is preferably within a range of 14–32 molar percent.

$B_2O_3$ is also an essential component of the glass of the present invention. It is both a component that enhances the melting properties of the glass and extremely effectively homogenizes the glass, and a component that changes the bonding property of OH within the glass when a small quantity of $B_2O_3$ is introduced and extremely effectively prevents the glass from bubbling during pressing. However, when the $B_2O_3$ content exceeds 15 molar percent, the glass of the present invention becomes highly unstable due to the introduction of large quantities of $Nb_2O_5$ and $WO_3$ having numerous noncrosslinked oxygen atoms to maintain a high refractive index. Conversely, when the quantity of $B_2O_3$ is less than 0.2 molar percent, the glass tends to develop bubbles during precision press molding. Accordingly, the range of the $B_2O_3$ content is set to 0.2–15 molar percent, preferably 0.5–13 molar percent.

The total content of $B_2O_3$ and $P_2O_5$ as glass meshlike structure formers is limited to the range of 15–35 molar percent. When the total quantity of $P_2O_5$ and $B_2O_3$ exceeds 35 molar percent, the glass refractive index drops and the Abbé number increases. Conversely, when the total quantity of $P_2O_5$ and $B_2O_3$ is less than 15 molar percent, the glass becomes extremely unstable. The total quantity of $P_2O_5$ and $B_2O_3$ is preferably within the range of 16–32 molar percent.

$WO_3$ is another essential component of the present invention, and is the most useful component for imparting a high refractive index and high dispersion properties at a low melting point without employing PbO. $WO_3$ imparts numerous noncrosslinked oxygen atoms to the glass, has the effect of reducing the glass transition temperature and yield point temperature in the same manner as alkali metal oxides, and raises the refractive index. Since it also has the effect of inhibiting wetting of the mold material by the glass, it substantially improves separation of the glass from the mold during precision press molding. However, when the content of $WO_3$ exceeds 45 molar percent, the glass may develop color, adhere due to melt and since the high temperature viscosity of the glass drops, it becomes difficult to manufacture glass preforms for precision pressing. Conversely, when the $WO_3$ content is not more than 6 molar percent, the glass transition temperature and yield point temperature rise and bubbles tend to form in the glass during precision pressing. Provided, even if the $WO_3$ content is not more than 6 molar percent, rise of the glass transition temperature and yield point temperature and occurrence of bubbles in the glass can be suppressed by increasing the content of alkali metal oxides and reduction of the $TiO_2$ and/or $Nb_2O_5$ content. Accordingly, the $WO_3$ content is to be the range of 0–45 molar percent. The $WO_3$ content may be within the range of 2–45 molar percent and preferably be within the range of 5–40 molar percent $Nb_2O_5$ is a component that is capable of imparting a large quantity of noncrosslinked oxygen to the glass and imparts characteristics such as high refractive index and low dispersion to the glass without the use of PbO. However, when the content of $Nb_2O_5$ exceeds 25 molar percent, the glass transition temperature and yield point temperature rise, stability deteriorates, high-temperature melting properties deteriorate, and the glass tends to develop bubbles and color during precision pressing. Accordingly, the content of $Nb_2O_5$ is not more than 25 molar percent. The $Nb_2O_5$ content is preferably within the range of 5–23 molar percent.

$TiO_2$ is a component capable of imparting a large amount of noncrosslinked oxygen to the glass and thus has the effect of raising the refractive index and dispersion of the glass, as well as improving transparency stability. However, when the content of $TiO_2$ exceeds 10 molar percent, the transparency stability of the glass deteriorates, the yield point temperature and liquid phase temperature rise sharply, and the glass tends to develop color during precision pressing. Accordingly, the content of $TiO_2$ is set to not more than 10 molar percent, preferably not more than 9 molar percent.

When the total quantity of $WO_3$, $Nb_2O_5$, and $TiO_2$ exceeds 45 molar percent, although a high refractive index and high dispersion characteristics are achieved, the molten glass develops color and there is a loss of transparency stability. When the total quantity is less than 20 percent, the number of noncrosslinked oxygen atoms in the glass decreases, making it impossible to obtain the desired refractive index or dispersion. Thus, the total quantity of $WO_3$, $Nb_2O_5$, and $TiO_2$ is set to the range of 20–45 molar percent. The total quantity of $WO_3$, $Nb_2O_5$, and $TiO_2$ preferably ranges from 21 to 42 molar percent and more preferably 25–42 molar percent. The coloring of glass in the glass with higher alkali metal oxide content can be avoided by controlling the total quantity of $WO_3$, $Nb_2O_5$, and $TiO_2$ within the above range.

BaO is a component that increases the refractive index of the glass and enhances transparency stability. Particularly when a large quantity of $WO_3$ is incorporated, the introduction of BaO suppresses the development of color in the glass and enhances transparency stability or resistance to transparency loss. However, when the content of BaO exceeds 25 molar percent, not only does the glass become unstable, but chemical durability and dispersion characteristics also deteriorate and glass transition temperature rises. Accordingly, the content of BaO is set to not more than 25 molar percent, preferably not more than 23 molar percent. The content of BaO is more preferably set to not more than 11 molar percent, still more preferably not more than 8 molar percent.

ZnO is a component that is incorporated to increase the refractive index and dispersion of the glass. The introduction of a small quantity of ZnO has the effect of decreasing the glass transition temperature, yield point temperature, and liquid phase temperature. However, when a large quantity is introduced, the transparency stability of the glass deteriorates sharply and may cause the liquid phase temperature to rise. Thus, the content thereof is set to not more than 20 percent, preferably not more than 17 percent.

The total quantity of BaO and ZnO is set to less than 30 molar percent. When the total quantity of BaO and ZnO exceeds 30 molar percent, glass stability deteriorates and the yield point temperature and liquid phase temperature rise, making it impossible to obtain the desired low yield point temperature and low liquid phase temperature. Accordingly, the total content of BaO and ZnO is set to less than 30 molar percent, preferably not more than 25 molar percent.

Alkali metal oxides such as $Li_2O$, $Na_2O$, and $K_2O$ are components that are incorporated because they improve the resistance to loss of transparency of the glass, decrease the yield point temperature and liquid phase temperature, and improve the high temperature melting properties of the glass. Thus, the content of each of $Li_2O$ and $Na_2O$ is set to not less than 2 molar percent, and the total content of $Li_2O$, $Na_2O$, and $K_2O$ is set to not less than 10 molar percent in the optical glass of mode I of the present invention. However, when the individual contents of $Li_2O$ and $Na_2O$ exceed 30 molar percent, or the total contents of $Li_2O$, $Na_2O$, and $K_2O$ exceed 45 molar percent, not only does the stability of the glass deteriorate, but it becomes impossible to achieve the desired high refractive index and high dispersion characteristics. Accordingly, the content of $Li_2O$ is set to 2–30 molar percent, the content of $Na_2O$ to 2–30 molar percent, and the content of $K_2O$ to 0–15 molar percent. Further, the total content of these three alkali metal oxides is set to the range of 10–45 molar percent. More preferably, the $Li_2O$ content is 5–27 molar percent, the $Na_2O$ content is 3–27 molar percent, and the $K_2O$ content is 0–13 molar percent, and the total content thereof is 12–43 molar percent. Preferably, the total contents of $Li_2O$, $Na_2O$, and $K_2O$ is equal to or more than 29 molar percent, more preferably equal to or more than 32 molar percent. Preferably, the total contents of $Li_2O$ and $Na_2O$ is equal to or more than 27 molar percent.

Further, alkali metal oxides may also be incorporated into the optical glass (9) of the present invention. At least one selected from among $Li_2O$, $Na_2O$, and $K_2O$ is selected as the alkali metal oxide. In the optical glass of mode II of the present invention, the content of $Li_2O$ is preferably 2–30 molar percent, more preferably 5–27 molar percent. The total contents of $Li_2O$, $Na_2O$, and $K_2O$ of is the optical glass (9) of the present invention is the same as those of the optical glasses (6) to (9) of the present invention mentioned above.

CaO, SrO, $Y_2O_3$, and $Al_2O_3$ are all optional components. The introduction of small quantities of CaO, SrO, $Y_2O_3$, and $Al_2O_3$ has the effects of decreasing the liquid phase temperature of the glass and improving stability. However, when the individual quantities of CaO and SrO exceed 10 molar percent, it is impossible to achieve the desired high refractive index and high dispersion characteristics, and resistance to loss of transparency deteriorates. Further, the same occurs when the content of $Y_2O_3$ exceeds 5 molar percent. Thus, the individual contents of CaO and SrO are each not more than 10 percent, and the content of $Y_2O_3$ is not more than 5 molar percent. The preferred content of CaO is 0–8 molar percent, that of SrO is 0–8 molar percent, and that of $Y_2O_3$ is 0–4 molar percent. The addition in suitable quantity of $Al_2O_3$, an optional component, improves viscosity at the liquid phase temperature of the glass and markedly improves the durability of the glass. However, when $Al_2O_3$ is incorporated in a quantity exceeding 5 molar percent, the glass tends not to melt and the yield point temperature and liquid phase temperature rise. Accordingly, the $Al_2O_3$ content is set to not more than 5 molar percent, preferably not more than 4 molar percent.

$As_2O_3$ and $Sb_2O_3$ are effective as glass clarifying agents. However, when either is added in a quantity exceeding 1 molar percent, the glass tends to develop bubbles during precision pressing. Thus, the content is set to not more than 1 molar percent.

The contents of each of the glass components has been described above. The total contents of all of these components is preferably not less than 94 molar percent, more preferably not less than 97 molar percent, still more preferably not less than 98 molar percent. It is also desirable that dopants employed, separately considered, consist only of the above-described components.

Specific examples of preferred compositions of the optical glasses (6)–(9) of the present invention will be described next.

In the preferred composition ranges, when denoted as molar percentages, the contents of the glass components are: 14–32 percent of $P_2O_5$, 0.5–13 percent of $B_2O_3$ (where the total quantity of $P_2O_5$ and $B_2O_3$ is 16–32 percent), 5–40 percent of $WO_3$, 5–23 percent of $Nb_2O_5$, 0–9 percent of $TiO_2$ (where the total quantity of $WO_3$, $Nb_2O_5$, and $TiO_2$ is 25–42 percent), 5–27 percent $Li_2O$, 3–27 percent $Na_2O$, 0–13 percent $K_2O$ (where the total quantity of $Li_2O$, $Na_2O$, and $K_2O$ is 12–43 percent), 0–23 percent of BaO, 0–17 percent of ZnO (where the total quantity of BaO and ZnO is 0–25 percent), 0–8 percent of CaO, 0–8 percent of SrO, 0–4 percent of $Al_2O_3$, 0–4 percent of $Y_2O_3$, 0–1 percent of $Sb_2O_3$, and 0–1 percent of $As_2O_3$, where the total of all of these components is not less than 94 percent. Within these ranges, the total of all of the above-listed components is preferably not less than 98 molar percent, and dopants, separately considered, preferably consist of only these components.

In more preferred ranges within the above-stated preferred composition ranges, when denoted as molar percentages, the contents of the glass components are: 17–30 percent of $P_2O_5$, 1–10 percent of $B_2O_3$ (where the total quantity of $P_2O_5$ and $B_2O_3$ is 18–32 percent), 5–25 percent of $WO_3$, 10–23 percent of $Nb_2O_5$, 1–9 percent of $TiO_2$ (where the total quantity of $WO_3$, $Nb_2O_5$,and $TiO_2$ is 28–40 percent), 5–22 percent $Li_2O$, 4–22 percent $Na_2O$, 0.5–7 percent $K_2O$ (where the total quantity of $Li_2O$, $Na_2O$, and $K_2O$ is 12–38 percent), 2–23 percent of BaO, 1–10 percent of ZnO (where the total quantity of BaO and ZnO is 3–25 percent), where the total of all of these components is not less than 94 percent. Within these ranges, the total of all of the above-listed components is preferably not less than 98 molar percent, and dopants, separately considered, preferably consist of only these components.

Components such as $SiO_2$, $La_2O_3$, $Y_2O_3$, $Gd_2O_3$, $ZrO_2$, $Ta_2O_5$, $Bi_2O_3$, $TeO_2$, CaO, MgO, and $Cs_2O$ may also be incorporated up to 6 percent so long as the object of the present invention is not lost.

In the low-melting-point, high refractive index, high dispersion optical glass of the present invention, the starting material for $P_2O_5$ is $H_3PO_4$, metaphosphate, diphosphorus pentoxide, or the like; the starting material for $B_2O_3$ is $HBO_3$, $B_2O_3$, or the like, and carbonates, nitrates, oxides, and the like may be suitably employed for the other components. These starting materials are weighed out in a prescribed ratio and mixed as ready mixed starting materials, which are then introduced to a melting furnace that has been heated to about 1,000–1,250° C. The starting materials are then melted, clarified, stirred, and homogenized, and then introduced into a casting mold and gradually cooled, yielding the low-melting-point, high refractive index, high dispersion optical glass of the present invention.

The optical glass has a liquid phase temperature of not more than 970° C., and since it retains a stable glass state at a viscosity suited to the molding of the precision press molded materials or "preforms" of the present invention from molten glass, preforms can be hot molded. Hot molding can be performed by causing molten glass to drip or flow down, receiving it in a receiving mold through a gas, and molding it into a desired shape such as a sphere or flattened sphere. When employing dripping to produce preforms, the glass temperature is adjusted to a viscosity capable of dripping and the glass is caused to drip, yielding spherical preforms. The dripped glass may be caused to harden during dripping, or floated on a blown gas and hardened while being rotated. When employing flow down to produce preforms, the glass is cut once it flows out of a flow-out pipe, the glass flowing down is received in a receiving mold through a gas, and the glass is molded into a sphere or flattened sphere and solidified. At this time, the glass that has been made to flow down is preferably cut without using a cutting blade. Among such cutting methods, the method where the receiving mold receives the front end of the glass that is flowing down and is then quickly lowered to sever the glass flow (referred to hereinafter as the drop cut method) is preferred. The viscosity of the glass flowing down when molding flowing glass into preforms is preferably 3–60 poise.

Based on this method, the molten glass flowing drown from the flow-out pipe is either caused to naturally drip, is severed by drop cutting, or is cut with a cutting blade to cause the glass to drop in globs. The molten glass glob is then received in a depression in a receiving mold. In this process, air, a nonreactive gas, or some other gas is blown out through fine holes in the depression to create a gas layer between the molten glass glob and the inner surface of the receiving mold depression. The molten glass glob is maintained and cooled within the depression in a state of essential non-contact with the inner surface of the depression until at least a portion of the outer surface of the molten glass glob reaches a temperature not greater than the melting temperature to efficiently manufacture glass preforms (precision press molding material).

The optical product of the present invention is obtained by precision press molding of a preform comprised of the above-described high refractive index, high dispersion optical glass of the present invention. Here, precision press molding refers to a molding method whereby a final product (in particular, optical parts such as lenses requiring high precision) is directly manufactured by press molding without a grinding or polishing step following pressing, where a molded product is obtained by precisely transferring to glass the shape of the molding surface of a mold that has been precisely manufactured ahead of time to correspond to the shape of the final product. Known pressing methods and devices may be employed, and the conditions may be suitably selected in consideration of the composition and physical properties of the glass. Aspherical lenses are an example of an optical product that is suitably manufactured by this method.

For example, the press device shown in FIG. 1 may be employed in precision press molding. In the device shown in FIG. 1, a casting mold comprised of an upper mold 1, a lower mold 2, and a guide mold 3 is mounted on a support base 10 positioned on a support rod 9, and the whole is positioned within a quartz tube 11 around which is wound a heater 12. A glass preform 4 molded from the high refractive index, high dispersion optical glass of the present invention, for example, in the form of a spheroid or elliptical spheroid with a diameter of about 2–20 mm can be employed. The size of the spheroid or elliptical spheroid is suitably determined in light of the size of the final product.

Once glass preform 4 has been positioned between lower mold 2 and upper mold 1, power is supplied to heater 12 and quartz tube 11 is heated. The temperature within the casting mold is controlled by means of a thermocouple 14 inserted into lower mold 2. The heating temperature is suited to precision pressing of the molded glass preform 4, and is set, for example to about $10^{7.6}$ poise. Once a prescribed temperature has been reached, pressure rod 13 is dropped downward, pushing upper mold 1 from above and pressing glass preform 4 within the casting mold. The pressure and duration of its application are suitably determined in consideration of the viscosity of the glass. For example, a pressure of about 4.9–14.7 MPa and a duration of 10–300 seconds may be employed. After pressing, the glass is slowly cooled to its transition temperature, and then rapidly cooled to room temperature. The molded product is then removed from the casting mold to obtain the optical product of the present invention.

The above-described optical glass is not limited to precision press molding; it can be applied to all applications of optical glass and applications demanding high-quality properties.

[Embodiments]

The present invention is described in detail below through embodiments. However, the present invention is in no way limited by these embodiments.

Embodiments 1–83

Corresponding oxides, fluorides, hydroxides, carbonates, sulfates, and nitrates were employed as the starting materials of each of the glass components. These were weighed out, thoroughly mixed, charged to a platinum crucible, melted at 1,000–1,250° C. with an electric furnace, stirred, homogenized, clarified, and poured into a preheated metal mold, then cooled to the transition temperature of the glass, immediately charged to an annealing furnace, and gradually cooled to room temperature to manufacture optical glass of the compositions shown in Tables 1–7.

Figure 2:
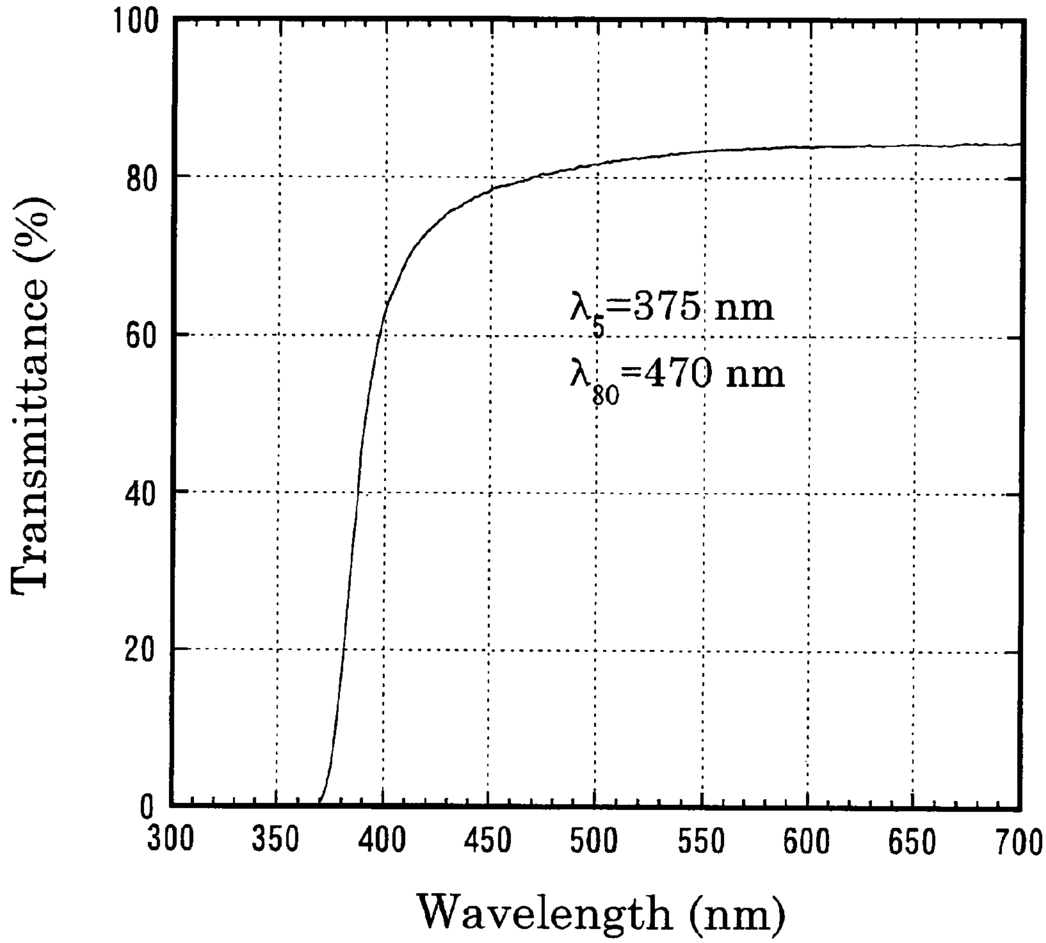
FIG. 2 is a spectro-transmittance curve of an optical glass of Example 78.

The refractive index [nd], Abbé number [vd], transition temperature [Tg], yield point temperature [Ts], liquid phase temperature [L.T.], and viscosity and coloration at the liquid phase temperature of the optical glass obtained were measured in the following manner. The results are given in Tables 1–7. In addition, spectro-transmittance curves of optical glasses of Examples 78–83 were measured and the results of Example 78 were shown in FIG. 2. Transmittance λ80 and λ5 of Examples 78–83 are listed in Table 8.

TABLE 1

| Component (molar %) | Ex. 1 | Ex. 2 | Ex. 3 | Ex. 4 | Ex. 5 | Ex. 6 | Ex. 7 |
|---|---|---|---|---|---|---|---|
| $P_2O_5$ | 25 | 25 | 20 | 20 | 20 | 17 | 17 |
| $B_2O_3$ | 5 | 5 | 5 | 5 | 5 | 5 | 5 |
| $WO_3$ | 6 | 6 | 10 | 15 | 20 | 18 | 18 |
| $Li_2O$ | 12 | 12 | 12 | 12 | 12 | 12 | 12 |
| $Na_2O$ | 10 | 10 | 10 | 10 | 10 | 10 | 10 |
| $K_2O$ | 3 | 3 | 3 | 3 | 3 | 3 | 3 |
| $Nb_2O_5$ | 23 | 23 | 20 | 15 | 10 | 12 | 12 |
| $TiO_2$ | | | 5 | 5 | 5 | 5 | 5 |
| CaO | | | | | | | |
| SrO | | | | | | | |
| BaO | 16 | 14 | 15 | 15 | 15 | 18 | 16 |
| $BaF_2$ | | 2 | | | | | |
| ZnO | | | | | | | |
| $Al_2O_3$ | | | | | | | 2 |
| $Y_2O_3$ | | | | | | | |
| Total content | 100 | 100 | 100 | 100 | 100 | 100 | 100 |
| $P_2O_5 + B_2O_3$ | 30 | 30 | 25 | 25 | 25 | 22 | 22 |
| $Li_2O + Na_2O + K_2O$ | 25 | 25 | 25 | 25 | 25 | 25 | 25 |
| $WO_3 + Nb_2O_5 + TiO_2$ | 29 | 29 | 35 | 35 | 35 | 35 | 35 |
| Glass transition temperature(° C.) | 516 | 505 | 508 | 492 | 475 | 466 | 463 |
| Yield point temperature(° C.) | 569 | 556 | 559 | 541 | 528 | 514 | 512 |
| Liquid phase temperature(° C.) | 960 | 960 | 950 | 899 | 820 | 880 | 890 |
| Refractive index(nd) | 1.82159 | 1.81971 | 1.85952 | 1.83263 | 1.80631 | 1.82606 | 1.82548 |
| Abbe number(ν d) | 25.62 | 25.66 | 23.68 | 24.89 | 26.34 | 26.09 | 25.91 |
| Viscosity at liquid phase temperature(Pas · s) | 0.4 | 0.4 | 0.2 | 0.4 | 1 | 0.3 | 0.3 |
| Density(g/cm$^3$) | 3.86 | 3.86 | 4.02 | 4.1 | 4.19 | 4.28 | 4.27 |
| Density of oxygen atoms($10^{22}$/cm$^3$) | 4.83 | 4.78 | 4.83 | 4.82 | 4.8 | 4.73 | 4.83 |

| Component (molar %) | Ex. 8 | Ex. 9 | Ex. 10 | Ex. 11 | Ex. 12 | Ex. 13 |
|---|---|---|---|---|---|---|
| $P_2O_5$ | 18 | 20 | 20 | 23 | 22 | 22 |
| $B_2O_3$ | 5 | 5 | 5 | 5 | 5 | 5 |
| $WO_3$ | 18 | 17.5 | 15 | 17.5 | 17.5 | 15 |
| $Li_2O$ | 12 | 12 | 12 | 12 | 12 | 12 |
| $Na_2O$ | 10 | 10 | 10 | 9 | 9 | 9 |
| $K_2O$ | 3 | 3 | 3 | 2 | 2 | 2 |
| $Nb_2O_5$ | 12 | 17.5 | 15 | 17.5 | 17.5 | 15 |
| $TiO_2$ | 5 | | 5 | | | 5 |
| CaO | | | | | | |
| SrO | | 2 | | | | |
| BaO | 10 | 6 | 8 | 8 | 10 | 10 |
| $BaF_2$ | | | | | | |
| ZnO | 7 | 7 | 7 | 6 | 5 | 5 |
| $Al_2O_3$ | | | | | | |
| $Y_2O_3$ | | | | | | |
| Total content | 100 | 100 | 100 | 100 | 100 | 100 |
| $P_2O_5 + B_2O_3$ | 23 | 25 | 25 | 28 | 27 | 27 |
| $Li_2O + Na_2O + K_2O$ | 25 | 25 | 25 | 23 | 23 | 23 |
| $WO_3 + Nb_2O_5 + TiO_2$ | 35 | 35 | 35 | 35 | 35 | 35 |
| Glass transition temperature(° C.) | 455 | 467 | 467 | 486 | 487 | 485 |
| Yield point temperature(° C.) | 502 | 512 | 516 | 533 | 534 | 533 |
| Liquid phase temperature(° C.) | 880 | 945 | 916 | 919 | 923 | 896 |
| Refractive index(nd) | 1.83019 | 1.84748 | 1.84253 | 1.83865 | 1.84227 | 1.83716 |
| Abbe number(ν d) | 24.78 | 24.01 | 23.83 | 24.06 | 24.24 | 24.08 |
| Viscosity at liquid phase temperature(Pas · s) | 0.4 | 0.3 | 0.3 | 0.4 | 0.3 | 0.4 |
| Density(g/cm$^3$) | 4.17 | 4.12 | 4.03 | 4.06 | 4.11 | 4.03 |
| Density of oxygen atoms($10^{22}$/cm$^3$) | 4.85 | 4.93 | 4.9 | 4.96 | 4.93 | 4.94 |

TABLE 2

| Component (molar %) | Ex. 14 | Ex. 15 | Ex. 16 | Ex. 17 | Ex. 18 | Ex. 19 | Ex. 20 |
|---|---|---|---|---|---|---|---|
| $P_2O_5$ | 20 | 20 | 21 | 22 | 22 | 22 | 22 |
| $B_2O_3$ | 5 | 5 | 5 | 5 | 5 | 5 | 5 |
| $WO_3$ | 11 | 12 | 10 | 10 | 12 | 11 | 15.5 |
| $Li_2O$ | 12 | 12 | 12 | 12 | 12 | 12 | 12 |
| $Na_2O$ | 10 | 10 | 10 | 10 | 9 | 9 | 9 |
| $K_2O$ | 3 | 3 | 3 | 3 | 2 | 2 | 2 |
| $Nb_2O_5$ | 19 | 18 | 20 | 20 | 18 | 19 | 19.5 |
| $TiO_2$ | 5 | 5 | 5 | 5 | 5 | 5 | |
| CaO | | | | | | | |
| SrO | | | | | | | |
| BaO | 15 | 12 | 14 | 13 | 10 | 15 | 9 |
| $BaF_2$ | | | | | | | |
| ZnO | | 3 | | | 5 | | 6 |
| $Al_2O_3$ | | | | | | | |
| $Y_2O_3$ | | | | | | | |
| Total content | 100 | 100 | 100 | 100 | 100 | 100 | 100 |
| $P_2O_5 + B_2O_3$ | 25 | 25 | 26 | 27 | 27 | 27 | 27 |
| $Li_2O + Na_2O + K_2O$ | 25 | 25 | 25 | 25 | 23 | 23 | 23 |
| $WO_3 + Nb_2O_5 + TiO_2$ | 35 | 35 | 35 | 35 | 35 | 35 | 35 |
| Glass transition temperature(° C.) | 502 | 490 | 511 | 508 | 495 | 511 | 492 |
| Yield point temperature(° C.) | 551 | 542 | 566 | 559 | 548 | 563 | 543 |
| Liquid phase temperature(° C.) | 940 | 935 | 938 | 928 | 917 | 924 | 940 |
| Refractive index(nd) | 1.85408 | 1.85282 | 1.85502 | 1.85059 | 1.85241 | 1.85176 | 1.85315 |
| Abbe number(ν d) | 23.88 | 23.7 | 23.63 | 23.59 | 23.4 | 23.85 | 23.63 |
| Viscosity at liquid phase temperature(Pas · s) | 0.3 | 0.3 | 0.3 | 0.4 | 0.4 | 0.4 | 0.4 |
| Density(g/cm$^3$) | 4.04 | 4.03 | 3.97 | 3.94 | 3.98 | 4.01 | 4.07 |
| Density of oxygen atoms($10^{22}$/cm$^3$) | 4.83 | 4.87 | 4.84 | 4.87 | 4.95 | 4.89 | 4.94 |

| Component (molar %) | Ex. 21 | Ex. 22 | Ex. 23 | Ex. 24 | Ex. 25 | Ex. 26 |
|---|---|---|---|---|---|---|
| $P_2O_5$ | 24 | 24 | 24 | 24 | 25 | 24 |
| $B_2O_3$ | 3 | 3.5 | 3 | 5 | 3 | 3 |
| $WO_3$ | 12 | 11 | 11 | 11.5 | 10 | 12 |
| $Li_2O$ | 12 | 12 | 9 | 12 | 12 | 12 |
| $Na_2O$ | 9 | 9 | 12 | 9 | 8 | 7 |
| $K_2O$ | 2 | 2 | 2 | 2 | 2 | 2 |
| $Nb_2O_5$ | 18 | 18.5 | 19 | 18.5 | 19 | 18 |
| $TiO_2$ | 5 | 5 | 5 | 5 | 5 | 4.5 |
| CaO | | | | | | |
| SrO | | | | | | |
| BaO | 10 | 8 | 8 | 8 | 8 | 11 |
| $BaF_2$ | | | | | | |
| ZnO | 5 | 7 | 7 | 5 | 8 | 6.5 |
| $Al_2O_3$ | | | | | | |
| $Y_2O_3$ | | | | | | |
| Total content | 100 | 100 | 100 | 100 | 100 | 100 |
| $P_2O_5 + B_2O_3$ | 27 | 27.5 | 27 | 29 | 28 | 27 |
| $Li_2O + Na_2O + K_2O$ | 23 | 23 | 23 | 23 | 22 | 21 |
| $WO_3 + Nb_2O_5 + TiO_2$ | 35 | 34.5 | 35 | 35 | 34 | 34.5 |
| Glass transition temperature(° C.) | 503 | 498 | 507 | 503 | 509 | 508 |
| Yield point temperature(° C.) | 556 | 549 | 559 | 554 | 564 | 558 |
| Liquid phase temperature(° C.) | 910 | 918 | 923 | 941 | 950 | 921 |
| Refractive index(nd) | 1.8459 | 1.83771 | 1.84817 | 1.8462 | 1.84832 | 1.84903 |
| Abbe number(ν d) | 23.54 | 23.26 | 23.27 | 23.27 | 23.29 | 23.55 |
| Viscosity at liquid phase temperature(Pas · s) | 0.8 | 0.9 | 1 | 0.7 | 0.6 | 0.9 |
| Density(g/cm$^3$) | 3.96 | 3.91 | 3.91 | 3.9 | 3.9 | 4.02 |
| Density of oxygen atoms($10^{22}$/cm$^3$) | 4.94 | 4.96 | 4.91 | 5 | 4.99 | 4.97 |

TABLE 3

| Component (molar %) | Ex. 27 | Ex. 28 | Ex. 29 | Ex. 30 | Ex. 31 | Ex. 32 | Ex. 33 |
|---|---|---|---|---|---|---|---|
| $P_2O_5$ | 24 | 24 | 22 | 20 | 24 | 20 | 20 |
| $B_2O_3$ | 3 | 4 | 3 | 3 | 3 | 5 | 8 |
| $WO_3$ | 12 | 10 | 10 | 10 | 10 | 17.5 | 5 |
| $Li_2O$ | 16 | 18 | 16 | 15 | 16 | 13 | 10 |
| $Na_2O$ | 10 | 14 | 18 | 20 | 15 | 9 | 10 |
| $K_2O$ | 2 | 2 | 8 | 7 | 7 | 3 | 5 |
| $Nb_2O_5$ | 18 | 20 | 18 | 18 | 18 | 17.5 | 20 |
| $TiO_2$ | 5 | 8 | 5 | 5 | 5 | | |
| CaO | | | | | | 2 | |
| SrO | | | | | | | |
| BaO | 5 | | | 2 | | 6 | 20 |
| $BaF_2$ | | | | | | | |

TABLE 3-continued

| | | | | | | | |
|---|---|---|---|---|---|---|---|
| ZnO | 5 | | | | 2 | 7 | |
| $Al_2O_3$ | | | | | | | |
| $Y_2O_3$ | | | | | | | 2 |
| Total content | 100 | 100 | 100 | 100 | 100 | 100 | 100 |
| $P_2O_5 + B_2O_3$ | 27 | 28 | 25 | 23 | 27 | 25 | 28 |
| $Li_2O + Na_2O + K_2O$ | 28 | 34 | 42 | 42 | 38 | 25 | 25 |
| $WO_3 + Nb_2O_5 + TiO_2$ | 35 | 38 | 33 | 33 | 33 | 35 | 25 |
| Glass transition temperature(° C.) | 486 | 493 | 446 | 441 | 452 | 464 | 507 |
| Yield point temperature(° C.) | 548 | 546 | 495 | 496 | 505 | 513 | 558 |
| Liquid phase temperature(° C.) | 905 | 925 | 890 | 875 | 880 | 940 | 940 |
| Refractive index(nd) | 1.84151 | 1.84937 | 1.80851 | 1.81741 | 1.81522 | 1.84709 | 1.82932 |
| Abbe number(ν d) | 23.25 | 21.96 | 23.5 | 23.92 | 23.45 | 24.25 | 27.4 |
| Viscosity at liquid phase temperature(Pas · s) | 0.9 | 0.9 | 0.4 | 0.3 | 0.9 | 0.3 | 0.3 |
| Density(g/cm³) | 3.84 | 3.63 | 3.45 | 3.49 | 3.44 | 4.11 | 3.87 |
| Density of oxygen atoms(10²²/cm³) | 4.99 | 5.03 | 4.59 | 4.5 | 4.64 | 4.96 | 4.57 |

| Component (molar %) | Ex. 34 | Ex. 35 | Ex. 36 | Ex. 37 | Ex. 38 | Ex. 39 |
|---|---|---|---|---|---|---|
| $P_2O_5$ | 23.6 | 23.6 | 21.1 | 20.3 | 21 | 18.7 |
| $B_2O_3$ | 4.4 | 4.4 | 6 | 4.3 | 4.4 | 7.5 |
| $WO_3$ | 15.7 | 15.7 | 15.9 | 15.3 | 15.7 | 16.1 |
| $Li_2O$ | 10.5 | 13.1 | 13.2 | 12.8 | 13.1 | 13.4 |
| $Na_2O$ | 10 | 7.4 | 7.5 | 7.2 | 10 | 7.6 |
| $K_2O$ | 2.6 | 2.6 | 2.7 | 2.6 | 2.6 | 2.7 |
| $Nb_2O_5$ | 16.5 | 16.5 | 16.7 | 16.1 | 16.5 | 16.9 |
| $TiO_2$ | | | | | | |
| CaO | | | | | | |
| SrO | | | | | | |
| BaO | 16.7 | 16.7 | 16.9 | 21.4 | 16.7 | 17.1 |
| $BaF_2$ | | | | | | |
| ZnO | | | | | | |
| $Al_2O_3$ | | | | | | |
| $Y_2O_3$ | | | | | | |
| Total content | 100 | 100 | 100 | 100 | 100 | 100 |
| $P_2O_5 + B_2O_3$ | 28 | 28 | 27.1 | 24.6 | 25.4 | 26.2 |
| $Li_2O + Na_2O + K_2O$ | 23.1 | 23.1 | 23.4 | 22.6 | 25.7 | 23.7 |
| $WO_3 + Nb_2O_5 + TiO_2$ | 32.2 | 32.2 | 32.6 | 31.4 | 32.2 | 33 |
| Glass transition temperature(° C.) | 511 | 510 | 502 | 506 | 494 | 495 |
| Yield point temperature(° C.) | 561 | 556 | 548 | 551 | 548 | 540 |
| Liquid phase temperature(° C.) | 880 | 892 | 905 | 918 | 909 | 927 |
| Refractive index(nd) | 1.80963 | 1.81467 | 1.82462 | 1.82386 | 1.81934 | 1.83378 |
| Abbe number(ν d) | 26.56 | 26.44 | 26.1 | 26.97 | 26.37 | 25.81 |
| Viscosity at liquid phase temperature(Pas · s) | 0.6 | 0.5 | 0.4 | 0.3 | 0.4 | 0.2 |
| Density(g/cm³) | 4.11 | 4.12 | 4.16 | 4.27 | 4.16 | 4.2 |
| Density of oxygen atoms(10²²/cm³) | 4.82 | 4.86 | 4.85 | 4.77 | 4.81 | 4.84 |

TABLE 4

| Component (molar %) | Ex. 40 | Ex. 41 | Ex. 42 | Ex. 43 | Ex. 44 | Ex. 45 | Ex. 46 |
|---|---|---|---|---|---|---|---|
| $P_2O_5$ | 18.4 | 18.4 | 18.4 | 17.8 | 17.4 | 17 | 18.1 |
| $B_2O_3$ | 6 | 6 | 4.4 | 4.3 | 4.2 | 4.1 | 5.8 |
| $WO_3$ | 15.9 | 15.9 | 15.7 | 20.4 | 24.9 | 29.1 | 20.6 |
| $Li_2O$ | 13.2 | 15.9 | 15.7 | 15.3 | 14.9 | 14.6 | 12.9 |
| $Na_2O$ | 10.2 | 7.5 | 10 | 9.8 | 9.5 | 9.3 | 7.3 |
| $K_2O$ | 2.7 | 2.7 | 2.6 | 2.6 | 2.5 | 2.4 | 2.6 |
| $Nb_2O_5$ | 16.7 | 16.7 | 16.5 | 13.5 | 10.7 | 8 | 16.2 |
| $TiO_2$ | | | | | | | |
| CaO | | | | | | | |
| SrO | | | | | | | |
| BaO | 16.9 | 16.9 | 16.7 | 16.3 | 15.9 | 15.5 | 16.5 |
| $BaF_2$ | | | | | | | |
| ZnO | | | | | | | |
| $Al_2O_3$ | | | | | | | |
| $Y_2O_3$ | | | | | | | |
| Total content | 100 | 100 | 100 | 100 | 100 | 100 | 100 |
| $P_2O_5 + B_2O_3$ | 24.4 | 24.4 | 22.8 | 22.1 | 21.6 | 21.1 | 23.9 |
| $Li_2O + Na_2O + K_2O$ | 26.1 | 26.1 | 28.3 | 27.7 | 26.9 | 26.3 | 22.8 |
| $WO_3 + Nb_2O_5 + TiO_2$ | 32.6 | 32.6 | 32.2 | 33.9 | 35.6 | 37.1 | 36.8 |
| Glass transition temperature(° C.) | 488 | 488 | 476 | 469 | 461 | 456 | 493 |
| Yield point temperature(° C.) | 530 | 536 | 521 | 515 | 503 | 495 | 540 |
| Liquid phase temperature(° C.) | 934 | 936 | 950 | 903 | 865 | 833 | 938 |
| Refractive index(nd) | 1.82803 | 1.83302 | 1.82707 | 1.82118 | 1.81597 | 1.81143 | 1.85328 |
| Abbe number(ν d) | 26.15 | 26.06 | 26.36 | 26.77 | 27.11 | 27.46 | 24.83 |
| Viscosity at liquid phase temperature(Pas · s) | 0.2 | 0.2 | 0.1 | 0.3 | 0.4 | 0.6 | 0.1 |
| Density(g/cm³) | 4.2 | 4.21 | 4.2 | 4.32 | 4.44 | 4.55 | 4.36 |
| Density of oxygen atoms(10²²/cm³) | 4.78 | 4.82 | 4.77 | 4.78 | 4.8 | 4.81 | 4.86 |

TABLE 4-continued

| Component (molar %) | Ex. 47 | Ex. 48 | Ex. 49 | Ex. 50 | Ex. 51 | Ex. 52 |
|---|---|---|---|---|---|---|
| $P_2O_5$ | 17.4 | 19.2 | 16.5 | 16.2 | 15.6 | 16.5 |
| $B_2O_3$ | 4.2 | 7.7 | 4 | 3.9 | 3.8 | 2.6 |
| $WO_3$ | 24.9 | 16.5 | 33.2 | 37 | 41.8 | 32.8 |
| $Li_2O$ | 12.4 | 13.8 | 14.2 | 13.9 | 13.5 | 14.1 |
| $Na_2O$ | 7 | 10.6 | 9.1 | 8.9 | 8.6 | 9 |
| $K_2O$ | 2.5 | 2.8 | 2.4 | 2.3 | 2.3 | 2.3 |
| $Nb_2O_5$ | 15.7 | 17.3 | 5.4 | 3 | | 7.7 |
| $TiO_2$ | | | | | | |
| CaO | | | | | | |
| SrO | | | | | | |
| BaO | 15.9 | 12.1 | 15.2 | 14.8 | 14.4 | 15 |
| $BaF_2$ | | | | | | |
| ZnO | | | | | | |
| $Al_2O_3$ | | | | | | |
| $Y_2O_3$ | | | | | | |
| Total content | 100 | 100 | 100 | 100 | 100 | 100 |
| $P_2O_5 + B_2O_3$ | 21.6 | 26.9 | 20.5 | 20.1 | 19.4 | 19.1 |
| $Li_2O + Na_2O + K_2O$ | 21.9 | 27.2 | 25.7 | 25.1 | 24.4 | 25.4 |
| $WO_3 + Nb_2O_5 + TiO_2$ | 40.6 | 33.8 | 38.6 | 40 | 41.8 | 40.5 |
| Glass transition temperature(° C.) | 495 | 485 | 452 | 448 | 445 | 458 |
| Yield point temperature(° C.) | 540 | 529 | 491 | 485 | 478 | 499 |
| Liquid phase temperature(° C.) | 928 | 921 | 790 | 747 | 781 | 840 |
| Refractive index(nd) | 1.87201 | 1.82954 | 1.80764 | 1.80397 | 1.79908 | 1.83131 |
| Abbe number(ν d) | 23.92 | 25.23 | 27.75 | 27.98 | 28.4 | 26.26 |
| Viscosity at liquid phase temperature(Pas · s) | 0.2 | 0.3 | 1 | 1.2 | 1 | 0.6 |
| Density($g/cm^3$) | 4.51 | 4.09 | 4.67 | 4.78 | 4.93 | 4.7 |
| Density of oxygen atoms($10^{22}/cm^3$) | 4.88 | 4.88 | 4.82 | 4.83 | 4.85 | 4.83 |

TABLE 5

| Component (molar %) | Ex. 53 | Ex. 54 | Ex. 55 | Ex. 56 | Ex. 57 | Ex. 58 | Ex. 59 |
|---|---|---|---|---|---|---|---|
| $P_2O_5$ | 15.8 | 16.3 | 15.8 | 2.3 | 22.8 | 20 | 21.2 |
| $B_2O_3$ | 1.3 | 1.3 | 1.3 | 1.4 | 0.5 | 1.4 | 1.4 |
| $WO_3$ | 36.3 | 37.1 | 31.8 | 15.4 | 15.3 | 2.0 | 15.4 |
| $Li_2O$ | 13.6 | 13.9 | 13.6 | 10.2 | 13.1 | 14.1 | 13.7 |
| $Na_2O$ | 8.7 | 11.2 | 8.7 | 12.4 | 12.3 | 12.1 | 12.4 |
| $K_2O$ | 2.3 | 2.3 | 2.3 | 2.6 | 2.5 | 2.5 | 2.6 |
| $Nb_2O_5$ | 7.5 | 7.7 | 7.5 | 18.8 | 17.4 | 14.1 | 17.1 |
| $TiO_2$ | | | 4.5 | | 5.1 | 5 | 5.1 |
| CaO | | | | | | | |
| BaO | 14.5 | 10.2 | 14.5 | 11.1 | 1.1 | 10.8 | 11.1 |
| $BaF_2$ | | | | | | | |
| ZnO | | | | 5.1 | | | |
| $Al_2O_3$ | | | | | | | |
| $Y_2O_3$ | | | | | | | |
| Total content | 100 | 100 | 100 | 100 | 100 | 100 | 100 |
| $P_2O_5 + B_2O_3$ | 17.1 | 17.6 | 17.1 | 24.4 | 23.3 | 21.4 | 22.6 |
| $Li_2O + Na_2O + K_2O$ | 24.6 | 27.4 | 24.6 | 25.2 | 27.9 | 28.7 | 28.7 |
| $WO_3 + Nb_2O_5 + TiO_2$ | 43.8 | 44.8 | 43.8 | 34.2 | 37.8 | 39.1 | 37.6 |
| Glass transition temperature(° C.) | 461 | 454 | 454 | 499 | 511 | 484 | 500 |
| Yield point temperature(° C.) | 502 | 492 | 492 | 548 | 560 | 529 | 545 |
| Liquid phase temperature(° C.) | 863 | 869 | 869 | 939 | 919 | 903 | 929 |
| Refractive index(nd) | 1.84927 | 1.84584 | 1.84584 | 1.83549 | 1.84497 | 1.8453 | 1.85101 |
| Abbe number(ν d) | 25.22 | 24.65 | 24.65 | 24.62 | 23.64 | 23.9 | 23.47 |
| Viscosity at liquid phase temperature(Pas · s) | 0.4 | 0.4 | 0.4 | 0.4 | 0.4 | 0.4 | 0.4 |
| Density($g/cm^3$) | 4.85 | 4.43 | 4.7 | 4.1 | 4.05 | 4.19 | 4.07 |
| Density of oxygen atoms($10^{22}/cm^3$) | 4.86 | 4.56 | 4.84 | 4.83 | 4.86 | 4.85 | 4.85 |

| Component (molar %) | Ex. 60 | Ex. 61 | Ex. 62 | Ex. 63 | Ex. 64 | Ex. 65 |
|---|---|---|---|---|---|---|
| $P_2O_5$ | 22.4 | 22.7 | 23.6 | 22.5 | 23.3 | 23.8 |
| $B_2O_3$ | 1.5 | 1.5 | 1.5 | 1.4 | 1.4 | 1.5 |
| $WO_3$ | 13 | 10.5 | 10.5 | 20 | 20 | 12.3 |
| $Li_2O$ | 13 | 13.6 | 11.8 | 17.9 | 16.6 | 20.2 |
| $Na_2O$ | 12.5 | 12.7 | 12.7 | 5.8 | 5.8 | 8.8 |
| $K_2O$ | 2.6 | 2.6 | 2.6 | 2.5 | 2.5 | |
| $Nb_2O_5$ | 18.6 | 19.7 | 20.6 | 14.1 | 14.6 | 19.4 |
| $TiO_2$ | 5.2 | 5.3 | 5.3 | 5 | 5 | 2.6 |
| CaO | | | | | | |
| BaO | 11.2 | 11.4 | 11.4 | 10.8 | 10.8 | 11.4 |
| $BaF_2$ | | | | | | |
| ZnO | | | | | | |
| $Al_2O_3$ | | | | | | |
| $Y_2O_3$ | | | | | | |

TABLE 5-continued

| | | | | | | |
|---|---|---|---|---|---|---|
| Total content | 100 | 100 | 100 | 100 | 100 | 100 |
| $P_2O_5 + B_2O_3$ | 23.9 | 24.2 | 25.1 | 23.9 | 24.7 | 25.3 |
| $Li_2O + Na_2O + K_2O$ | 28.1 | 28.9 | 27.1 | 26.2 | 24.9 | 29 |
| $WO_3 + Nb_2O_5 + TiO_2$ | 36.8 | 35.5 | 36.4 | 39.1 | 39.6 | 34.3 |
| Glass transition temperature(° C.) | 510 | 512 | 525 | 501 | 507 | 508 |
| Yield point temperature(° C.) | 556 | 558 | 577 | 549 | 564 | 565 |
| Liquid phase temperature(° C.) | 935 | 942 | 942 | 898 | 899 | 933 |
| Refractive index(nd) | 1.84733 | 1.84587 | 1.85072 | 1.84893 | 1.8505 | 1.84613 |
| Abbe number(ν d) | 23.58 | 23.67 | 23.32 | 23.65 | 23.48 | 24.16 |
| Viscosity at liquid phase temperature(Pas · s) | 0.4 | 0.3 | 0.4 | 0.3 | 0.4 | 0.4 |
| Density(g/cm$^3$) | 4 | 3.94 | 3.93 | 4.15 | 4.15 | 3.98 |
| Density of oxygen atoms($10^{22}$/cm$^3$) | 4.86 | 4.86 | 4.86 | 4.95 | 4.97 | 4.98 |

TABLE 6

| Component (molar %) | Ex. 66 | Ex. 67 | Ex. 68 | Ex. 69 | Ex. 70 | Ex. 71 |
|---|---|---|---|---|---|---|
| $P_2O_5$ | 23.7 | 23.7 | 24.5 | 24.1 | 24.3 | 24.1 |
| $B_2O_3$ | 2.5 | 2.5 | 2.5 | 1.2 | 1.2 | 1.2 |
| $WO_3$ | 10.7 | 10.7 | 10.7 | 13 | 12.9 | 13 |
| $Li_2O$ | 11.9 | 12.3 | 11.1 | 12.6 | 12.1 | 12.6 |
| $Na_2O$ | 5.7 | 8.2 | 8.2 | 7.3 | 7.3 | 7.3 |
| $K_2O$ | 2.5 | | | | | |
| $Nb_2O_5$ | 17.6 | 17.2 | 17.6 | 16.6 | 16.5 | 16.6 |
| $TiO_2$ | 4.9 | 4.9 | 4.9 | 4.9 | 4.8 | 4.9 |
| CaO | | | | | | |
| SrO | | | | | | |
| BaO | 15.6 | 15.6 | 15.6 | 15.4 | 16.1 | 13.8 |
| $BaF_2$ | | | | | | |
| ZnO | 4.9 | 4.9 | 4.9 | 4.9 | 4.8 | 6.5 |
| $Al_2O_3$ | | | | | | |
| $Y_2O_3$ | | | | | | |
| Total content | 100 | 100 | 100 | 100 | 100 | 100 |
| $P_2O_5 + B_2O_3$ | 26.2 | 26.2 | 27 | 25.3 | 25.5 | 25.3 |
| $Li_2O + Na_2O + K_2O$ | 20.1 | 20.5 | 19.3 | 19.9 | 19.4 | 19.9 |
| $WO_3 + Nb_2O_5 + TiO_2$ | 33.2 | 32.8 | 33.2 | 34.5 | 34.2 | 34.5 |
| Glass transition temperature(° C.) | 522 | 518 | 527 | 521 | 524 | 518 |
| Yield point temperature(° C.) | 575 | 569 | 575 | 576 | 577 | 570 |
| Liquid phase temperature(° C.) | 923 | 915 | 937 | 932 | 935 | 921 |
| Refractive index(nd) | 1.84407 | 1.84373 | 1.84414 | 1.84842 | 1.84835 | 1.85019 |
| Abbe number(ν d) | 24.44 | 24.6 | 24.43 | 24.28 | 24.42 | 24.06 |
| Viscosity at liquid phase temperature(Pas · s) | 0.7 | 0.8 | 0.9 | 0.9 | 0.8 | 1 |
| Density(g/cm$^3$) | 4.06 | 4.07 | 4.06 | 4.13 | 4.06 | 4.07 |
| Density of oxygen atoms($10^{22}$/cm$^3$) | 4.89 | 4.93 | 4.94 | 4.94 | 4.84 | 4.9 |

| Component (molar %) | Ex. 72 | Ex. 73 | Ex. 74 | Ex. 75 | Ex. 76 | Ex. 77 |
|---|---|---|---|---|---|---|
| $P_2O_5$ | 24.1 | 24.1 | 24.2 | 24.2 | 17.4 | 22.6 |
| $B_2O_3$ | 1.2 | 1.2 | 1.2 | 1.2 | 4.2 | 3.8 |
| $WO_3$ | 13 | 13 | 13 | 13 | 18.6 | 34.8 |
| $Li_2O$ | 14.2 | 12.6 | 12.6 | 12.6 | 12.4 | 13.5 |
| $Na_2O$ | 5.7 | 7.3 | 7.3 | 7.3 | 7 | 8.6 |
| $K_2O$ | | | | | 2.5 | 2.3 |
| $Nb_2O_5$ | 16.6 | 16.6 | 16.6 | 16.6 | 16.6 | 22 |
| $TiO_2$ | 4.9 | 4.9 | 4.9 | 4.9 | 4.9 | |
| CaO | | | | | | |
| SrO | | | | | | |
| BaO | 13.8 | 12.2 | 10.5 | 8.9 | 15.9 | 14 |
| $BaF_2$ | | | | | | |
| ZnO | 6.5 | 8.1 | 9.7 | 11.3 | | |
| $Al_2O_3$ | | | | | | |
| $Y_2O_3$ | | | | | | |
| Total content | 100 | 100 | 100 | 100 | 100 | 100 |
| $P_2O_5 + B_2O_3$ | 25.3 | 25.3 | 25.4 | 25.4 | 21.6 | 19.4 |
| $Li_2O + Na_2O + K_2O$ | 19.9 | 19.9 | 19.9 | 19.9 | 21.9 | 24.4 |
| $WO_3 + Nb_2O_5 + TiO_2$ | 34.5 | 34.5 | 34.5 | 34.5 | 40.6 | 34.8 |
| Glass transition temperature(° C.) | 517 | 513 | 511 | 506 | 527 | 471 |
| Yield point temperature(° C.) | 570 | 566 | 564 | 558 | 575 | 505 |
| Liquid phase temperature(° C.) | 924 | 925 | 925 | 920 | 960 | 750 |
| Refractive index(nd) | 1.85313 | 1.85202 | 1.85349 | 1.85508 | 1.905 | 1.735 |
| Abbe number(ν d) | 24 | 23.85 | 23.64 | 23.4 | 22.72 | 308 |
| Viscosity at liquid phase temperature(Pas · s) | 1 | 0.9 | 0.9 | 0.9 | 2.5 | 2.6 |
| Density(g/cm$^3$) | 4.13 | 4.15 | 4.07 | 4.06 | 4.023 | 4.01 |
| Density of oxygen atoms($10^{22}$/cm$^3$) | 4.99 | 5.04 | 4.99 | 5.02 | 4.75 | 4.71 |

TABLE 7

| Component (molar %) | Ex.78 | Ex.79 | Ex.80 | Ex.81 | Ex.82 | Ex.83 |
|---|---|---|---|---|---|---|
| $P_2O_5$ | 24 | 24 | 23 | 24 | 23.9 | 24 |
| $B_2O_3$ | 3 | 5 | 5 | 5 | 4 | 4 |
| $WO_3$ | 8 | 5 | 7 | 5 | 5 | 4 |
| $Li_2O$ | 22 | 20 | 18 | 21 | 17.9 | 17 |
| $Na_2O$ | 11 | 11 | 14 | 13 | 13.9 | 15 |
| $K_2O$ | 2 | 2 | 2 | 2 | 2 | 2 |
| $Nb_2O_5$ | 18 | 21 | 19 | 21 | 22.4 | 23 |
| $TiO_2$ | 6 | 5 | 6 | 5 | 5 | 5 |
| CaO | | | | | | |
| SrO | | | | | | |
| BaO | 3 | 6 | 4 | 3 | 5 | 5 |
| $BaF_2$ | | | | | | |
| ZnO | 3 | 1 | 2 | 1 | 1 | 1 |
| $Al_2O_3$ | | | | | | |
| $Y_2O_3$ | | | | | | |
| Total content | 100 | 100 | 100 | 100 | 100.1 | 100 |
| $P_2O_5 + B_2O_3$ | 27 | 29 | 28 | 29 | 27.9 | 28 |
| $Li_2O + Na_2O + K_2O$ | 35 | 33 | 34 | 36 | 33.8 | 34 |
| $WO_3 + Nb_2O_5 + TiO_2$ | 32 | 31 | 32 | 31 | 32.4 | 32 |
| Glass transition temperature (° C.) | 467 | 482 | 471 | 478 | 484 | 490 |
| Yeild point temperature (° C.) | 513 | 532 | 520 | 526 | 535 | 540 |
| Liquid phase temperature (° C.) | 900 | 920 | 920 | 930 | 930 | 930 |
| Refractive index(nd) | 1.82121 | 1.8283 | 1.82255 | 1.82291 | 1.8372 | 1.83635 |
| Abbe number(υd) | 24 | 24.01 | 23.93 | 23.86 | 23.41 | 23.42 |
| Viscosity at liquid phase temperature (Pas · s) | 4.7 | 5.2 | | 4.6 | 5.2 | |
| Density(g/cm$^3$) | 3.602 | 3.617 | 3.63 | 3.545 | 3.631 | 3.61 |
| Density of oxygen atoms ($10^{22}$/cm$^3$) | 4.95 | 4.97 | 4.96 | 4.99 | 4.95 | 4.94 |

TABLE 8

| Example | $\lambda_{80}$(nm) | $\lambda_5$(nm) |
|---|---|---|
| Ex.78 | 375 | 470 |
| Ex.79 | 371 | 475 |
| Ex.80 | 371 | 478 |
| Ex.81 | 371 | 487 |
| Ex.82 | 371 | 490 |
| Ex.83 | 371 | 488 |

(1) Refractive index [nd] and Abbé number [νd]

These were measured for optical glass obtained at a gradual cooling temperature reduction rate of −30° C./h.

(2) Transition temperature [Tg] and yield point temperature [Ts]

These were measured at a rate of temperature rise of 4° C./min with a thermomechanical analyzer from Rigaku Denki K.K.

(3) Liquid phase temperature (LT)

The optical glass was kept in a loss of transparency test furnace with a 400–1,100° C. temperature gradient, the presence or absence of crystals was observed with a microscope at 80-fold magnification, and the liquid phase temperature was measured.

(4) Viscosity at liquid-phase temperature

The viscosity at the liquid phase temperature was measured by the rotating cylinder (Margules) method (Naruse, Habuku, "Glass Engineering" (Kyotatsu Shuppan).

COMPARATIVE EXAMPLES 1–3

Comparative Examples 1–3 are Embodiment 9 described in Japanese Patent Unexamined Publication No. Sho 55-37500, Embodiment 4 described in Japanese Patent Unexamined Publication No. Sho 56-40094, and Embodiment 1 described in Japanese Patent Unexamined Publication No. Hei 5-51233. These glasses are given as comparative examples. The characteristics of these glasses were measured in the same manner as for the embodiments. The results are given in Table 9.

TABLE 9

| Component (wt %) | Comp.Ex.1 | Comp.Ex.2 | Comp.Ex.3 |
|---|---|---|---|
| $P_2O_5$ | 25.88 | 34.00 | $GeO_2$ = 7.0 |
| $B_2O_3$ | 7.26 | | 5.00 |
| $Al_2O_3$ | MgO = 0.77 | | $SiO_2$ = 12.0 |
| $Li_2O$ | CaO = 1.18 | | 1.30 |
| $Na_2O$ | PbO = 15.55 | | 10.70 |
| $K_2O$ | 8.29 | | 7.50 |
| $SrO_2$ | 0.42 | | $Cs_2O$ = 8.5 |
| BaO | 1.60 | | 3.30 |
| $BaF_2$ | | | |
| ZnO | 0.31 | 43.00 | |
| $Y_2O_3$ | | | |
| $TiO_2$ | | | 25.70 |
| $Nb_2O_5$ | 38.74 | 23.00 | 19.00 |
| $WO_3$ | | | |
| Total content | | | |
| $LiO_2 + Na_2O + K_2O$ | | | |
| Glass transition temperature(° C.) | | | |
| Yeild point temperature(° C.) | 617 | 583 | 520 |
| Liquid phase temperature (° C.) | 1020 | 1100 | 1050 |
| Refractive index(nd) | 1.78750 | 1.75550 | 1.80550 |
| Abbe number(υd) | 26.70 | 33.40 | 25.20 |
| | S55-37500 | S56-40094 | H5-51233 |
| Viscosity at liquid phase temperature(Pas · s) | | | |

From the above-stated results, it was confirmed that the glasses of the embodiments all had refractive indexes [nd] of 1.75–2.00 and an Abbé number νd of 20–28.5. All of the glasses were also confirmed to have a transition temperature [Tg] of not more than 530° C., a yield point temperature [Ts] of not more than 580° C., a liquid phase temperature [L.T.] of not more than 970° C., to be suited to precision pressing, and to have good resistance to loss of transparency. (Some of the glasses had a viscosity at the liquid phase temperature of 0.4 Pa·s or greater.)

By contrast, the glasses of the comparative examples had elevated liquid phase temperatures [L.T.] of 1,000° C. or more. Comparative Examples 1 and 2 had a yield point temperature [Ts] of greater than 580° C. and were not suited to mass production.

Embodiment 84

The press device of FIG. 1 was used to obtain aspherical lenses by aspherical precision pressing the glasses obtained in Embodiments 1–83. The glasses of the embodiments in the form of spheroids of about 2–20 mm in diameter were positioned between lower mold 2 and upper mold 1, a nitrogen atmosphere was provided within quartz tube 11, and power was supplied to heater 12 to heat the interior of quartz tube 11. The temperature within the casting mold was adjusted to a temperature at which the viscosity of the glass glob being molded was about 10.8 Pa·s, and while maintaining this temperature, pressure rod 13 was dropped to press against upper mold 1, thereby pressing the glass glob being molded within the casting mold. The pressure applied was 8 MPa and the duration of pressure was 30 sec. After pressing, the pressure was removed, the molded glass body that had been subjected to aspherical press molding was cooled to the transition temperature while still in contact with lower mold 2 and upper mold 1, the molded body was rapidly cooled to the vicinity of room temperature, and the aspherically molded glass was recovered from the casting mold. The aspherical lenses obtained were extremely high precision lenses.

Embodiment 85

In the same manner as in Embodiments 1–83, glass was melted, clarified, stirred, and caused to flow out through a platinum alloy outflow pipe. The above-described drop cut method was employed to obtain spherical precision press molding materials (preforms) 4 that were 2–30 mm in diameter. The 83 types of preform 4 that were obtained by this method were comprised of the optical glasses obtained in Embodiments 1–83. Aspherical lenses were obtained from these preforms 4 using the press device shown in FIG. 1 by aspherical precision press molding as described further below.

First, a spherical preform 4 some 2–30 mm in diameter was positioned between lower mold 2 and upper mold 1, a nitrogen atmosphere was provided within quartz tube 11, and power was supplied to heater 12 to heat the interior of quartz tube 11. The temperature within the casting mold was set to a temperature some 20–60° C. higher than the yield point temperature of the glass (the temperature at which the viscosity of the glass reached $10^{7.6}$ poise), and while maintaining this temperature, pressure rod 13 was dropped to press against upper mold 1, thereby pressing preform 4 within the casting mold. The pressure applied was 8 MPa and the pressing time was 30 sec. Subsequently, the pressure was removed, the molded glass product that had been pressure molded was cooled to a temperature 30° C. lower than the transition temperature of the glass while still in contact with lower mold 2 and upper mold 1, the molded product was rapidly cooled to the vicinity of room temperature, and the aspherical lens was recovered from the casting mold. The 83 types of aspherical lenses obtained were all of high precision and had the optical constants recorded in Tables 1–7.

Based on the present invention, a low-melting-point optical glass is provided that has a high refractive index and high dispersion characteristics, a glass transition temperature of not more than 530° C., a yield point temperature of not more than 580° C., a liquid phase temperature of not more than 970° C., resistance to loss of transparency, and good molding properties. Further, the use of the optical glass of the present invention permits the extension of the service life of the mold material employed in precision pressing and permits stable precision pressing. Further, precision pressing of the low-melting-point optical glass of the present invention makes it possible to obtain optical products such as aspherical lenses. The glass of the present invention may also be employed as common optical glass. As described above, the optical glass for precision press molding of the present invention is highly useful in industry.

Based on the present invention, optical glass having a high refractive index and high dispersion characteristics that is suited to precision press molding, and a precision press molding material comprised of this glass, are provided. Specifically, the optical glass of the present invention has a glass transition temperature Tg of not more than 530° C. and/or a yield point temperature Ts of not more than 580° C. Since excellent resistance to loss of transparency characteristics are obtained when the liquid phase temperature is not more than 970° C., not only is the optical glass suited to precision press molding, but molten glass can be made to drip from a flowout pipe to manufacture stable, well-formed precision press molding materials.

Further, based on the present invention, the use of the above-described optical glass extends the service life of the mold employed in precision press molding, stable precision press molding can be conducted, and in particular, this optical glass is suited to the manufacturing of optical parts, particularly aspherical lenses.

What is claimed is:

1. An optical glass comprising as molar percentages, 15–30 percent of $P_2O_5$; 0.5–15 percent of $B_2O_3$; 5–25 percent of $Nb_2O_5$; 6–40 percent of $WO_3$; 4–45 percent of at least one $R'_2O$ selected from the group consisting of $Li_2O$, $Na_2O$, and $K_2O$; 1–5 percent of $K_2O$; 0–30 percent (excluding 30 percent) of at least one RO selected from the group consisting of BaO, ZnO, and SrO; and 2–9 percent of $TiO_2$; with the total content of the above-stated components being equal to or more than 95 percent, and wherein the optical glass comprises 2–30 molar percent of $Li_2O$ and does not comprise an amount of $GeO_2$.

2. The optical glass of claim 1 exhibiting a refractive index in the range of from 1.75 to 2.0, an Abbé number in the range of from 20 to 28.5, and a viscosity at a liquid phase temperature equal to or higher than 0.4 Pa·s.

3. The optical glass of claim 1 wherein said optical glass comprises 0–25 molar percent (excluding 0 molar percent) of BaO.

4. The optical glass of claim 1 wherein said optical glass has the composition comprising, as essential components, $P_2O_5$, $B_2O_3$, $WO_3$, $Nb_2O_5$, TiO2, BaO, ZnO, $Li_2O$, $Na_2O$ and $K_2O$ or the composition comprising the above essential components and $Sb_2O_3$.

5. The optical glass of claim 1 wherein said optical glass comprises 0–11 percent of BaO.

6. The optical glass of claim 1 wherein said total quantity of $Li_2O$, $Na_2O$, and $K_2O$ is equal to or more than 29 percent.

7. An optical part being composed of the optical glass of claim 6.

8. The optical glass of claim 1, wherein said optical glass has a density of oxygen atoms contained in the range of from $4.2\times10^{22}$ to $5.2\times10^{22}/cm^3$.

9. The optical glass of claim 1 wherein said optical glass exhibits a glass transition temperature equal to and/or less than 530° C. and a yield point temperature equal to or less than 580° C.

10. The optical glass of claim 1 wherein said optical glass exhibits a refractive index in the range of from 1.7 to 2.0, an Abbé number in the range of from 20 to 32.

11. The optical glass of claim 1 wherein said optical glass exhibits a liquid phase temperature equal to or less than 970° C.

12. An optical part being composed of the optical glass of claim 1.

13. The optical glass of claim 1, wherein the optical glass exhibits a refractive index of from 1.75 to 2.0, an Abbé number in the range of from 20 to 28.5, and a glass transition temperature equal to or less than 540° C.

14. The optical glass of claim 1, wherein the optical glass exhibits a refractive index of from 1.75 to 2.0, an Abbé number in the range of from 20 to 28.5, a transmittance λ80 equal to or less than 500 nm, and a transmittance λ5 equal to or less than 385 nm.

15. The optical glass of claim 1, wherein the optical glass comprises $Sb_2O_3$.

16. A glass preform for precision press-molding composed of the optical glass of claim 1.

17. An optical part prepared by precisely press-molding the glass preform of claim 16.

18. An optical part composed of the optical glass of claim 1.

19. An optical glass comprising, as molar percentages, 17–30 percent of $P_2O_5$, 1–10 percent of $B_2O_3$ (where the total quantity of $P_2O_5$ and $B_2O_3$ is 18–32 percent), 5–25 percent of $WO_3$, 10–23 percent of $Nb_2O_5$, 1–9 percent of $TiO_2$ (where the total quantity of $WO_3$, $Nb_2O_5$ and $TiO_2$ is 28–40 percent), 5–22 percent $Li_2O$, 4–22 percent of $Na_2O$, 0.5–7 percent $K_2O$ (where the total quantity of $Li_2O$, $Na_2O$, and $K_2O$ is 12–38 percent), 2–23 percent of BaO, 1–10 percent of ZnO (where the total quantity of BaO and ZnO is 3–25 percent), 0–8 percent of CaO, 0–8 percent of SrO, 0–4 percent of $Al_2O_3$, 0–4 percent of $Y_2O_3$, 0–1 percent of $Sb_2O_3$, and 0–1 percent of $As_2O_3$, where the total of all of these components is not less than 94 percent, and wherein the optical glass does not comprise an amount of $GeO_2$.

20. The optical glass of claim 19 exhibiting a refractive index in the range of from 1.75 to 2.0, an Abbé number in the range of from 20 to 28.5, and a glass transition temperature equal to or less than 540° C.

21. The optical glass of claim 19 wherein said optical glass has the composition comprising, as essential components, $P_2O_5$, $B_2O_3$, $WO_3$, $Nb_2O_5$, $TiO_2$, BaO, ZnO, $Li_2O$, $Na_2O$ and $K_2O$ or the composition comprising the above essential components and $Sb_2O_3$.

22. The optical glass of claim 19 wherein said optical glass has a density of oxygen atoms contained in the range of from $4.2\times10^{22}$ to $5.2\times10^{22}/cm^3$.

23. The optical glass of claim 19 wherein said optical glass exhibits a glass transition temperature equal to and/or less than 530° C. and a yield point temperature equal to or less than 580° C.

24. The optical glass of claim 19 wherein said optical glass exhibits a refractive index in the range of from 1.7 to 2.0, an Abbé number in the range of from 20 to 32.

25. The optical glass of claim 19 wherein said optical glass exhibits a liquid phase temperature equal to or less than 970° C.

26. An optical part being composed of the optical glass of claim 19.

27. The optical glass of claim 19 wherein said optical glass comprises 0–11 percent of BaO.

28. The optical glass of claim 19 wherein said total quantity of $Li_2O$, $Na_2O$, and $K_2O$ is equal to or more than 29 percent.

29. The optical glass of claim 19, wherein the optical glass exhibits a refractive index of from 1.75 to 2.0, an Abbé number in the range of from 20 to 28.5, and a viscosity at a liquid phase temperature equal to or higher than 0.4 Pa·s.

30. The optical glass of claim 19, wherein the content of $TiO_2$ is 2 percent or more.

31. The optical glass of claim 19, wherein the content of $K_2O$ is 1 percent or more.

32. The optical glass of claim 19, wherein the optical glass comprises $Sb_2O_3$.

33. A glass preform for precision press-molding composed of the optical glass of claim 19.

34. An optical part prepared by precisely press-molding the glass preform of claim 33.

35. A glass preform for precision press-molding composed of an optical glass comprising, as molar percentages. 15–30 percent of $P_2O_5$, 0.5–15 percent of $B_2O_3$; 5–25 percent of $Nb_2O_5$; 6–40 percent of $WO_3$;4–45 percent of at least one $R'_2O$ selected from the group consisting of $Li_2O$, $Na_2O$, and $K_2O$, 1–5 percent of $K_2O$; 0–30 percent (excluding 30 percent) of at least one RO selected from the group consisting of BaO, ZnO, and SrO; and 2–9 percent of $TiO_2$; with the total content of the above-stated components being equal to or more than 95 percent, wherein the optical glass has the composition comprising, as essential components, $P_2O_5$, $B_2O_3$, $WO_3$, $Nb_2O_5$, $TiO_2$, BaO, ZnO, $Li_2O$, $Na_2O$, and $K_2O$ or the composition comprising the above essential components and $Sb_2O_3$.

36. An optical part prepared by precisely press-molding the glass preform of claim 35.

37. An optical glass comprising, as molar percentages:

12–34 percent of $P_2O_5$;

0.2–15 percent of $B_2O_3$, where the total quantity of $P_2O_5$ and $B_2O_3$ is 15–35 percent;

2–40 percent of $WO_3$;

0–25 percent (excluding 0 percent) of $Nb_2O_5$;

0 to 10 percent (excluding 0 percent) of TiO2, where the total quantity of $WO_3$, $Nb_2O_5$ and $TiO_2$ is 20–45 percent;

0–25 percent (excluding 0 percent) of BaO;

0–20 percent (excluding 0 percent) of ZnO, where the total quantity of BaO and ZnO is less than 30 percent;

2–30 percent of $Li_2O$;

2–30 percent of $Na_2O$;

0–15 percent (excluding 0 Percent) of $K_2O$, where the total quantity of $Li_2O$, $Na_2O$, and $K_2O$ is 29–45 percent;

0–10 percent of CaO;

0–10 percent of SrO;

0–5 percent of $Al_2O_3$;

0–5 percent of $Y_2O_3$;

0–1 percent of $Sb_2O_3$; and

0–1 percent of $As_2O_3$, where the total quantity of all of the above-listed components is equal to or more than 94 percent; and wherein said optical glass comprises, as essential components, $P_2O_5$, $B_2O_3$, $WO_3$, $Nb_2O_5$, TiO2, BaO, ZnO, $Li_2O$, $Na_2O$ and $K_2O$, and does not comprises an amount of $GeO_2$.

38. The optical glass of claim 37 wherein said optical glass comprises $Sb_2O_3$.

39. A glass preform for precision press-molding composed of the optical glass of claim 38.

40. An optical part composed of the optical glass of claim 38.

41. The optical glass of claim 37 wherein the content of $TiO_2$ is 2 percent or more.

42. A glass preform for precision press-molding composed of the optical glass of claim 41.

43. An optical part composed of the optical glass of claim 41.

44. The optical glass of claim 37 wherein the content of $K_2O$ is 1 percent of more.

45. A glass preform for precision press-molding composed of the optical glass of claim 44.

46. An optical part composed of the optical glass of claim 44.

47. An optical glass comprising, as molar percentages:

12–34 percent of $P_2O_5$;

0.2–15 percent of $B_2O_3$, where the total quantity of $P_2O_5$ and $B_2O_3$ is 15–35 percent;

2–40 percent of $WO_3$;

0–25 percent (excluding 0 percent) of $Nb_2O_5$;

0 to 10 percent (excluding 0 percent) of $TiO_2$, where the total quantity of $WO_3$, $Nb_2O_5$ and $TiO_2$ is 20–45 percent;

0–11 percent (excluding 0 Percent) of BaO;

0–20 percent (excluding 0 Percent) of ZnO, where the total quantity of BaO and ZnO is less than 30 percent;

2–30 percent of $Li_2O$;

2–30 percent of $Na_2O$;

0–15 percent (excluding 0 percent) of $K_2O$, where the total quantity of $Li_2O$, $Na_2O$ and $K_2O$ is 10–45 percent;

0–10 percent of CaO;

0–10 percent of SrO;

0–5 percent of $Al_2O_3$;

0–5 percent of $Y_2O_3$;

0–1 percent of $Sb_2O_3$; and

0–1 percent of $As_2O_3$, where the total quantity of all of the above-listed components is equal to or more than 94 percent; and wherein said optical glass comprises, as essential components, $P_2O_5$, $B_2O_3$, $WO_3$, $Nb_2O_5$, $TiO_2$, BaO, ZnO, $Li_2O$, $Na_2O$ and $K_2O$, and does not comprises an amount of $GeO_2$.

48. The optical glass of claim 47 wherein said optical glass comprises $Sb_2O_3$.

49. A glass preform for precision press-molding composed of the optical glass of claim 48.

50. An optical part composed of the optical glass of claim 48.

51. The optical glass of claim 47 wherein the content of $TiO_2$ is 2 percent or more.

52. A glass preform for precision press-molding composed of the optical glass of claim 51.

53. An optical part composed of the optical glass of claim 51.

54. The optical glass of claim 47 wherein the content of $K_2O$ is 1 percent of more.

55. A glass preform for precision press-molding composed of the optical glass of claim 54.

56. An optical part composed of the optical glass of claim 54.

57. The optical glass of claim 47, wherein the optical glass exhibits a refractive index of from 1.75 to 2.0, an Abbé number in the range of from 20 to 28.5, a transmittance λ80 equal to or less than 500 nm, and a transmittance λ5 equal to or less than 385 nm.

58. A glass preform for precision press-molding composed of the optical glass of claim 47.

59. An optical part composed of the optical glass of claim 47.

60. An optical glass exhibiting a refractive index in the range of from 1.75 to 2.0, an Abbé number in the range of from 20 to 28.5, a liquid phase temperature equal to or less than 970° C., and a transmittance λ80 equal to or less than 500 nm and a transmittance λ5 equal to or less than 385 nm, wherein said optical glass has a composition comprising, as essential components, $P_2O_5$, $B_2O_3$, $WO_3$, and TiO2, does not comprise substantial amount of GeO2, and comprises, as molar percentages, 12–34 percent of $P_2O_5$; 0.2–15 percent of $B_2O_3$; 0–25 percent of $Nb_2O_5$; 0–40 percent (excluding 0 percent) of $WO_3$; 2–10 percent of $TiO_2$; 4–45 percent of at least one $R'_2O$ selected from the group consisting of $Li_2O$, $Na_2O$, and $K_2O$; and 0–30 percent (excluding 30 percent) of at least one RO selected from the group consisting of BaO, ZnO, and SrO; with the total content of the above-stated components being equal to or more than 94 percent.

61. A precision press molding glass preform composed of the optical glass of claim 60.

62. An optical part prepared by precisely press molding the precision press molding preform glass of claim 61.

63. An optical part composed of the optical glass of claim 60.

64. The optical glass of claim 60, wherein the optical glass exhibits a refractive index of from 1.75 to 2.0, an Abbé number in the range of from 20 to 28.5, and a viscosity at a liquid phase temperature equal to or higher than 0.4 Pa·s.

65. The optical glass of claim 60, wherein the optical glass exhibits a refractive index of from 1.75 to 2.0, an Abbé number in the range of from 20 to 28.5, and a glass transition temperature equal to or less than 540° C.

66. The optical glass of claim 60, wherein the optical glass comprises 0–25 molar percent (excluding 0 molar percent) of BaO.

67. The optical glass of claim 60, wherein the optical glass has the composition comprising as essential components, $P_2O_5$, $B_2O_3$, $WO_3$, $TiO_2$, BaO, ZnO, $Li_2O$, $Na_2O$ and $K_2O$ or the composition comprising the above essential components and $Sb_2O_3$.

68. The optical glass of claim 60, wherein the optical glass comprises 0–11 percent BaO.

69. The optical glass of claim 60, wherein the total quantity of $Li_2O$, Na2O and $K_2O$ is equal to or more than 29 percent.

70. The optical glass of claim 60, wherein the optical glass has a density of oxygen atoms in the range of from $4.2\times10^{22}$ to $5.2\times10^{22}/cm^3$.

71. The optical glass of claim 60, wherein the optical glass exhibits a glass transition temperature equal to or less than 530° C. and a yield temperature equal to or less than 580° C.

72. The optical glass of claim 60, wherein the content of $K_2O$ is 1 percent or more.

73. The optical glass of claim 60, wherein the optical glass comprises $Sb_2O_3$.

74. An optical glass comprising, as molar percentages, 14–32 percent of $P_2O_5$, 0.5–13 percent of $B_2O_3$ (where the total quantity of $P_2O_5$ and $B_2O_3$ is 16–32 percent), 5–40 percent of $WO_3$, 5–23 percent of $Nb_2O_5$, 1–9 percent of $TiO_2$ (where the total quantity of $WO_3$, $Nb_2O_5$ and $TiO_2$ is 25–42 percent), 5–27 percent $Li_2O$, 3–27 percent $Na_2O$, 0.5–7 percent $K_2O$ (where the total quantity of $Li_2O$, $Na_2O$, and $K_2O$ is 12–43 percent), 0–23 percent (excluding 0 percent) of BaO, 0–17 percent (excluding 0 percent) of ZnO (where the total quantity of BaO and ZnO> is 0–25 percent), 0–8 percent of CaO, 0–8 percent of SrO, 0–4 percent of $Al_2O_3$, 0–4 percent of $Y_2O_3$, 0–1 percent of $Sb_2O_3$, and 0–1 percent of $As_2O_3$, where the total of all of these components is not less than 94 percent, wherein the optical glass does not comprise an amount of $GeO_2$, and wherein said optical glass has the composition comprising, as essential components, $P_2O_5$, $B_2O_3$, $WO_3$, $Nb_2O_5$, $TiO_2$, BaO, ZnO, $Li_2O$, $Na_2O$ and $K_2O$ or the composition comprising the above essential components and $Sb_2O_3$.

75. The optical glass of claim 74, wherein the optical glass exhibits a refractive index of from 1.75 to 2.0, an Abbé number in the range of from 20 to 28.5, and a viscosity at a liquid phase temperature equal to or higher than 0.4 Pa·s.

76. The optical glass of claim 74, wherein the optical glass exhibits a refractive index of from 1.75 to 2.0, an Abbé number in the range of from 20 to 28.5, and a glass transition temperature equal to or less than 540° C.

77. The optical glass of claim 74, wherein the optical glass exhibits a refractive index of from 1.75 to 2.0, an Abbé number in the range of from 20 to 28.5, a transmittance λ80 equal to or less than 500 nm, and a transmittance λ5 equal to or less than 385 nm.

78. The optical glass of claim 74, wherein the optical glass comprises 0–11 percent BaO.

79. The optical glass of claim 74, wherein the total quantity of $Li_2O$, $Na_2O$ and $K_2O$ is equal to or more than 29 percent.

80. The optical glass of claim 74, wherein the optical glass has a density of oxygen atoms in the range of from $4.2\times10^{22}$ to $5.2\times10^{22}/cm^3$.

81. The optical glass of claim 74, wherein the optical glass exhibits a glass transition temperature equal to or less than 530° C. and a yield temperature equal to or less than 580° C.

82. The optical glass of claim 74, wherein the optical glass exhibits a refractive index of from 1.7 to 2.0, and an Abbé number in the range of from 20 to 32.

83. The optical glass of claim 74, wherein the optical glass exhibits a liquid phase temperature equal to or less than 970° C.

84. The optical glass of claim 74, wherein the content of $TiO_2$ is 2 percent or more.

85. The optical glass of claim 74, wherein the content of $K_2O$ is 1 percent or more.

86. The optical glass of claim 74, wherein the the optical glass comprises $Sb_2O_3$.

87. A glass preform for precision press-molding composed of the optical glass of claim 74.

88. An optical part prepared by precisely press-molding the glass preform of claim 87.

89. An optical part composed of the optical glass of claim 74.

90. An optical glass comprising, as molar percentages, 14–32 percent of $P_2O_5$, 0.5–13 percent of $B_2O_3$ (where the total quantity of $P_2O_5$ and $B_2O_3$ is 16–32 percent), 5–40 percent of $WO_3$, 5–23 percent of $Nb_2O_5$, 1–9 percent of $TiO_2$ (where the total quantity of $WO_3$, $Nb_2O_5$, and $TiO_2$ is 25–42 percent), 5–27 percent $Li_2O$, 3–27 percent $Na_2O$, 0.5–7 percent $K_2O$ (where the total quantity of $Li_2O$, $Na_2O$, and $K_2O$ is 29–43 percent), 0–23 percent of BaO, 0–17 percent of ZnO (where the total quantity of BaO and ZnO is 0–25 percent), 0–8 percent of CaO, 0–8 percent of SrO, 0–4 percent of $Al_2O_3$, 0–4 percent of $Y_2O_3$, 0–1 percent of $Sb_2O_3$, and 0–1 percent of $As_2O_3$, where the total of all of these components is not less than 94 percent, wherein the optical glass does not comprise an amount of $GeO_2$.

91. The optical glass of claim 90, wherein the optical glass exhibits a refractive index of from 1.75 to 2.0, an Abbé number in the range of from 20 to 28.5, and a viscosity at a liquid phase temperature equal to or higher than 0.4 Pa·s.

92. The optical glass of claim 90, wherein the optical glass exhibits a refractive index of from 1.75 to 2.0, an Abbé number in the range of from 20 to 28.5, and a glass transition temperature equal to or less than 540° C.

93. The optical glass of claim 90, wherein the optical glass exhibits a refractive index of from 1.75 to 2.0, an Abbé number in the range of from 20 to 28.5, a transmittance λ80 equal to or less than 500 nm, and a transmittance λ5 equal to or less than 385 nm.

94. The optical glass of claim 90, wherein the optical glass has the composition comprising, as essential components, $P_2O_5$, $B_2O_3$, $WO_3$, $TiO_2$, BaO, ZnO, $Li_2O$, $Na_2O$ and $K_2O$ or the composition comprising the above essential components and $Sb_2O_3$.

95. The optical glass of claim 90, wherein the optical glass comprises 0–11 percent of BaO.

96. The optical glass of claim 90, wherein the optical glass has a density of oxygen atoms in the range of from $4.2\times10^{22}$ to $5.2\times10^{22}/cm^3$.

97. The optical glass of claim 90, wherein the optical glass exhibits a glass transition temperature equal to or less than 530 C. and a yield temperature equal to or less than 580° C.

98. The optical glass of claim 90, wherein the optical glass exhibits a refractive index of from 1.7 to 2.0, and an Abbé number in the range of from 20 to 32.

99. The optical glass of claim 90, wherein the optical glass exhibits a liquid phase temperature equal to or less than 970° C.

100. The optical glass of claim 90, wherein the content of $TiO_2$ is 2 percent or more.

101. The optical glass of claim 90, herein the content of $K_2O$ is 1 percent or more.

102. The optical glass of claim 90, wherein the optical glass comprises $Sb_2O_3$.

103. A glass preform for precision press-molding composed of the optical glass of claim 90.

104. An optical part prepared by precisely press-molding the glass preform of claim 103.

105. An optical part composed of the optical glass of claim 90.

106. A glass preform for precision press-molding composed of the optical glass of claim 90.

107. An optical part composed of the optical glass of claim 90.

* * * * *